US012706030B2

(12) United States Patent
Lee et al.

(10) Patent No.: US 12,706,030 B2
(45) Date of Patent: Aug. 11, 2026

(54) GATE DRIVING CIRCUIT, DISPLAY DEVICE INCLUDING THE GATE DRIVING CIRCUIT AND ELECTRONIC DEVICE INCLUDING THE GATE DRIVING CIRCUIT

(71) Applicant: Samsung Display Co., LTD., Yongin-si (KR)

(72) Inventors: Wonjun Lee, Yongin-si (KR); Sungmin Son, Yongin-si (KR); Chaehan Hyun, Yongin-si (KR); Minji Kim, Yongin-si (KR); Geumju Moon, Yongin-si (KR); Hyungjin Song, Yongin-si (KR); Soojo Ock, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/219,174

(22) Filed: May 27, 2025

(65) Prior Publication Data

US 2026/0065845 A1 Mar. 5, 2026

(30) Foreign Application Priority Data

Sep. 3, 2024 (KR) ........................ 10-2024-0119550

(51) Int. Cl.
*G09G 3/32* (2016.01)

(52) U.S. Cl.
CPC ....... *G09G 3/32* (2013.01); *G09G 2310/0267* (2013.01); *G09G 2310/0286* (2013.01); *G09G 2310/08* (2013.01); *G09G 2320/0233* (2013.01)

(58) Field of Classification Search
CPC ............. G09G 3/32; G09G 2310/0267; G09G 2310/0286; G09G 2310/08; G09G 2320/0233; G09G 3/30–3291; G09G 2300/0819; G09G 2300/0842–0871
See application file for complete search history.

(56) References Cited

U.S. PATENT DOCUMENTS

| | | | | |
|---|---|---|---|---|
| 10,453,386 B2 * | 10/2019 | Jang | G09G 3/3266 |
| 11,741,903 B2 * | 8/2023 | In | G09G 3/3233 345/212 |
| 11,869,400 B2 * | 1/2024 | Kwon | G09G 3/3266 |
| 12,394,346 B2 * | 8/2025 | Lim | G09G 3/32 |
| 2019/0066604 A1 * | 2/2019 | Kong | G09G 3/3291 |

(Continued)

FOREIGN PATENT DOCUMENTS

KR 20230111692 A 7/2023

*Primary Examiner* — Amy Onyekaba
(74) *Attorney, Agent, or Firm* — CANTOR COLBURN LLP

(57) ABSTRACT

A gate driving circuit includes a first control circuit for controlling a voltage of a first control node, a second control circuit for controlling a voltage of a second control node, and an output circuit for outputting a first clock signal or a first voltage as a gate signal based on the voltage of the first control node and the voltage of the second control node. The second control circuit includes a switching circuit connected to a first node and a second node, and for receiving the second clock signal, a second capacitor including a first electrode connected to the first node and a second electrode connected to the second node, and a fourth capacitor including a first electrode for receiving a second voltage and a second electrode connected to the second node.

20 Claims, 17 Drawing Sheets

(56) References Cited

U.S. PATENT DOCUMENTS

| | | | | |
|---|---|---|---|---|
| 2021/0366408 | A1* | 11/2021 | In | G09G 3/3291 |
| 2022/0270530 | A1* | 8/2022 | Wang | G09G 3/035 |
| 2022/0351659 | A1* | 11/2022 | Kwon | G09G 3/20 |
| 2023/0178027 | A1* | 6/2023 | In | G11C 19/287<br>345/212 |
| 2023/0351941 | A1* | 11/2023 | In | G09G 3/3233 |
| 2024/0212549 | A1* | 6/2024 | Lim | G09G 3/32 |

* cited by examiner

GATE DRIVING CIRCUIT, DISPLAY DEVICE INCLUDING THE GATE DRIVING CIRCUIT AND ELECTRONIC DEVICE INCLUDING THE GATE DRIVING CIRCUIT

This application claims priority to Korean Patent Application No. 10-2024-0119550, filed on Sep. 3, 2024, and all the benefits accruing therefrom under 35 U.S.C. § 119, the content of which in its entirety is herein incorporated by reference.

BACKGROUND

1. Field

Embodiments of the present invention relate to a gate driving circuit, a display device and an electronic device. More particularly, the gate driving circuit, the display device including the gate driving circuit and the electronic device including the gate driving circuit.

2. Description of the Related Art

Generally, a display device may include a display panel and a display panel driver. The display panel may include a plurality of gate lines, a plurality of emission lines, a plurality of data lines and a plurality of pixels. The display panel driver may include a gate driving circuit providing a gate signal to the gate lines, an emission driving circuit providing an emission signal to the emission lines and a data driving circuit providing a data voltage to the data lines. In addition, the display panel driver may further include a driving controller controlling the gate driving circuit, the emission driving circuit and the data driving circuit.

The gate driving circuit may include a plurality of stages. Each of the stages may include a plurality of transistors and a plurality of capacitors. In addition, each of the stages may receive a plurality of clock signals. The clock signals may be output as output signals of the stages.

When a voltage of a first electrode of a capacitor is changed, a voltage of a second electrode of the capacitor may be changed by a coupling of the capacitor. That is, a voltage of the clock signal applied to the second electrode of the capacitor may be changed. When the voltage of the clock signal is changed, the output signal of the stage, which includes the capacitor and outputs the clock signal as the output signal, may be unstable. Accordingly, a stability and a reliability of the gate driving circuit including the stage may decrease. In addition, the pixel receiving the output signal of the gate driving circuit may not sufficiently operate a threshold voltage compensation operation. Accordingly, the pixel may not sufficiently emit a light at a luminance corresponding to the data voltage.

SUMMARY

Embodiments of the present invention provide a gate driving circuit having an improved stability and an improved reliability.

Embodiments of the present invention provide a display device including the gate driving circuit.

Embodiments of the present invention provide an electronic device including the gate driving circuit.

In an embodiment of the gate driving circuit according to the present invention, the gate driving circuit includes a first control circuit configured to control a voltage of a first control node based on an input signal, a first clock signal and a second clock signal, a second control circuit configured to control a voltage of a second control node based on the first clock signal and the second clock signal, and an output circuit configured to output the first clock signal or a first voltage as a gate signal based on the voltage of the first control node and the voltage of the second control node. The second control circuit includes a switching circuit connected to a first node and a second node, and configured to receive the second clock signal, a second capacitor including a first electrode connected to the first node and a second electrode connected to the second node, and a fourth capacitor including a first electrode configured to receive a second voltage and a second electrode connected to the second node.

In an embodiment, the switching circuit may include a sixth transistor including a control electrode connected to the first node, a first electrode connected to a third node and a second electrode configured to receive the second clock signal, and a seventh transistor including a control electrode connected to the first node, a first electrode connected to the second node and a second electrode connected to the third node.

In an embodiment, the switching circuit may include a seventh transistor including a control electrode connected to the first node, a first electrode connected to the second node and a second electrode configured to receive the second clock signal.

In an embodiment, the second voltage may be substantially the same as the first voltage.

In an embodiment, the second control circuit may further include a third transistor including a control electrode configured to receive the first clock signal, a first electrode configured to receive the first voltage and a second electrode connected to a fifth node, a fourth transistor including a control electrode configured to receive the first voltage, a first electrode connected to the fifth node and a second electrode connected to the first node, a fifth transistor including a control electrode connected to the first control node, a first electrode configured to receive the first clock signal and a second electrode connected to the fifth node, an eighth transistor including a control electrode configured to receive the second clock signal, a first electrode connected to the second node and a second electrode connected to the second control node, and a first capacitor including a first electrode configured to receive the first clock signal and a second electrode connected to the second control node.

In an embodiment, the first control circuit may include a first transistor including a control electrode configured to receive the first clock signal, a first electrode configured to receive the input signal and a second electrode connected to a fourth node, a second transistor including a control electrode connected to the first control node, a first electrode connected to a sixth node and a second electrode configured to receive the second clock signal, an eleventh transistor including a control electrode configured to receive the first voltage, a first electrode connected to the fourth node and a second electrode connected to the first control node, and a third capacitor including a first electrode connected to the first control node and a second electrode connected to the sixth node.

In an embodiment, the output circuit may include a ninth transistor including a control electrode connected to the second control node, a first electrode configured to receive the first clock signal and a second electrode connected to an output node, and a tenth transistor including a control electrode connected to the first control node, a first electrode connected to the output node and a second electrode configured to receive the first voltage.

In an embodiment, the gate driving circuit may further include a reset circuit configured to initialize the first control node and the second control node based on a reset signal. The reset circuit may include a twelfth transistor including a control electrode configured to receive the reset signal, a first electrode configured to receive the first clock signal and a second electrode connected to a fourth node, and a thirteenth transistor including a control electrode configured to receive the reset signal, a first electrode connected to the second control node and a second electrode configured to receive the first voltage.

In an embodiment of the display device according to the present invention, the display device includes a display panel including a plurality of pixels, a data driving circuit configured to provide a data voltage to the pixels, a gate driving circuit configured to provide a gate signal to the pixels, and a driving controller configured to control the data driving circuit and the gate driving circuit. The gate driving circuit includes a first control circuit configured to control a voltage of a first control node based on an input signal, a first clock signal and a second clock signal, a second control circuit configured to control a voltage of a second control node based on the first clock signal and the second clock signal, and an output circuit configured to output the first clock signal or a first voltage as the gate signal based on the voltage of the first control node and the voltage of the second control node. The second control circuit includes a switching circuit connected to a first node and a second node, and configured to receive the second clock signal, a second capacitor including a first electrode connected to the first node and a second electrode connected to the second node, and a fourth capacitor including a first electrode configured to receive a second voltage and a second electrode connected to the second node.

In an embodiment, the switching circuit may include a sixth transistor including a control electrode connected to the first node, a first electrode connected to a third node and a second electrode configured to receive the second clock signal, and a seventh transistor including a control electrode connected to the first node, a first electrode connected to the second node and a second electrode connected to the third node.

In an embodiment, the switching circuit may include a seventh transistor including a control electrode connected to the first node, a first electrode connected to the second node and a second electrode configured to receive the second clock signal.

In an embodiment, the second voltage may be substantially the same as the first voltage.

In an embodiment, the second control circuit may further include a third transistor including a control electrode configured to receive the first clock signal, a first electrode configured to receive the first voltage and a second electrode connected to a fifth node, a fourth transistor including a control electrode configured to receive the first voltage, a first electrode connected to the fifth node and a second electrode connected to the first node, a fifth transistor including a control electrode connected to the first control node, a first electrode configured to receive the first clock signal and a second electrode connected to the fifth node, an eighth transistor including a control electrode configured to receive the second clock signal, a first electrode connected to the second node and a second electrode connected to the second control node, and a first capacitor including a first electrode configured to receive the first clock signal and a second electrode connected to the second control node.

In an embodiment, the first control circuit may include a first transistor including a control electrode configured to receive the first clock signal, a first electrode configured to receive the input signal and a second electrode connected to a fourth node, a second transistor including a control electrode connected to the first control node, a first electrode connected to a sixth node and a second electrode configured to receive the second clock signal, an eleventh transistor including a control electrode configured to receive the first voltage, a first electrode connected to the fourth node and a second electrode connected to the first control node, and a third capacitor including a first electrode connected to the first control node and a second electrode connected to the sixth node.

In an embodiment, the output circuit may include a ninth transistor including a control electrode connected to the second control node, a first electrode configured to receive the first clock signal and a second electrode connected to an output node, and a tenth transistor including a control electrode connected to the first control node, a first electrode connected to the output node and a second electrode configured to receive the first voltage.

In an embodiment, the display device may further include a reset circuit configured to initialize the first control node and the second control node based on a reset signal. The reset circuit may include a twelfth transistor including a control electrode configured to receive the reset signal, a first electrode configured to receive the first clock signal and a second electrode connected to a fourth node, and a thirteenth transistor including a control electrode configured to receive the reset signal, a first electrode connected to the second control node and a second electrode configured to receive the first voltage.

In an embodiment of an electronic device according to the present invention, the electronic device includes a display panel including a plurality of pixels, a data driving circuit configured to provide a data voltage to the pixels, a gate driving circuit configured to provide a gate signal to the pixels, a driving controller configured to control the data driving circuit and the gate driving circuit, and a processor configured to output a power-on signal, input image data and an input control signal to the driving controller. When the electronic device is powered on, the processor is configured to output the power-on signal to the driving controller. The driving controller is configured to output a reset signal to the gate driving circuit for initializing the gate driving circuit in response to the power-on signal, to output a start signal, a first clock signal and a second clock signal for operating the gate driving circuit in response to the input control signal. The gate driving circuit includes a first control circuit configured to control a voltage of a first control node based on an input signal, the first clock signal and the second clock signal, a second control circuit configured to control a voltage of a second control node based on the first clock signal and the second clock signal, a reset circuit configured to initialize the first control node and the second control node based on the reset signal, and an output circuit configured to output the first clock signal or a first voltage as the gate signal based on the voltage of the first control node and the voltage of the second control node. The second control circuit includes a switching circuit connected to a first node and a second node, and configured to receive the second clock signal, a second capacitor including a first electrode connected to the first node and a second electrode connected to the second node, and a fourth capacitor including a first electrode configured to receive a second voltage and a second electrode connected to the second node.

In an embodiment, the switching circuit may include a sixth transistor including a control electrode connected to the first node, a first electrode connected to a third node and a second electrode configured to receive the second clock signal, and a seventh transistor including a control electrode connected to the first node, a first electrode connected to the second node and a second electrode connected to the third node.

In an embodiment, the second control circuit may further include a third transistor including a control electrode configured to receive the first clock signal, a first electrode configured to receive the first voltage and a second electrode connected to a fifth node, a fourth transistor including a control electrode configured to receive the first voltage, a first electrode connected to the fifth node and a second electrode connected to the first node, a fifth transistor including a control electrode connected to the first control node, a first electrode configured to receive the first clock signal and a second electrode connected to the fifth node, an eighth transistor including a control electrode configured to receive the second clock signal, a first electrode connected to the second node and a second electrode connected to the second control node, and a first capacitor including a first electrode configured to receive the first clock signal and a second electrode connected to the second control node.

In an embodiment, the first control circuit may include a first transistor including a control electrode configured to receive the first clock signal, a first electrode configured to receive the input signal and a second electrode connected to a fourth node, a second transistor including a control electrode connected to the first control node, a first electrode connected to a sixth node and a second electrode configured to receive the second clock signal, an eleventh transistor including a control electrode configured to receive the first voltage, a first electrode connected to the fourth node and a second electrode connected to the first control node, and a third capacitor including a first electrode connected to the first control node and a second electrode connected to the sixth node.

The gate driving circuit, the display device including the gate driving circuit and the electronic device including the gate driving circuit according to embodiments of the present invention may improve a stability and a reliability of the gate signal output from the gate driving circuit. More particularly, the gate driving circuit may include the second capacitor including the first electrode for receiving the first clock signal and the second electrode connected to the second node, and the fourth capacitor including the first electrode for receiving the second voltage and the second electrode connected to the second node. A voltage which is a difference between the second voltage and a voltage of the second node may be stored in the fourth capacitor. Accordingly, when a voltage of the first node is changed, the stability of the voltage of the second node may increase by the voltage stored in the fourth capacitor. That is, when the voltage of the first node is changed, an amount of change in the voltage of the second node may decrease.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION

Figure 1:
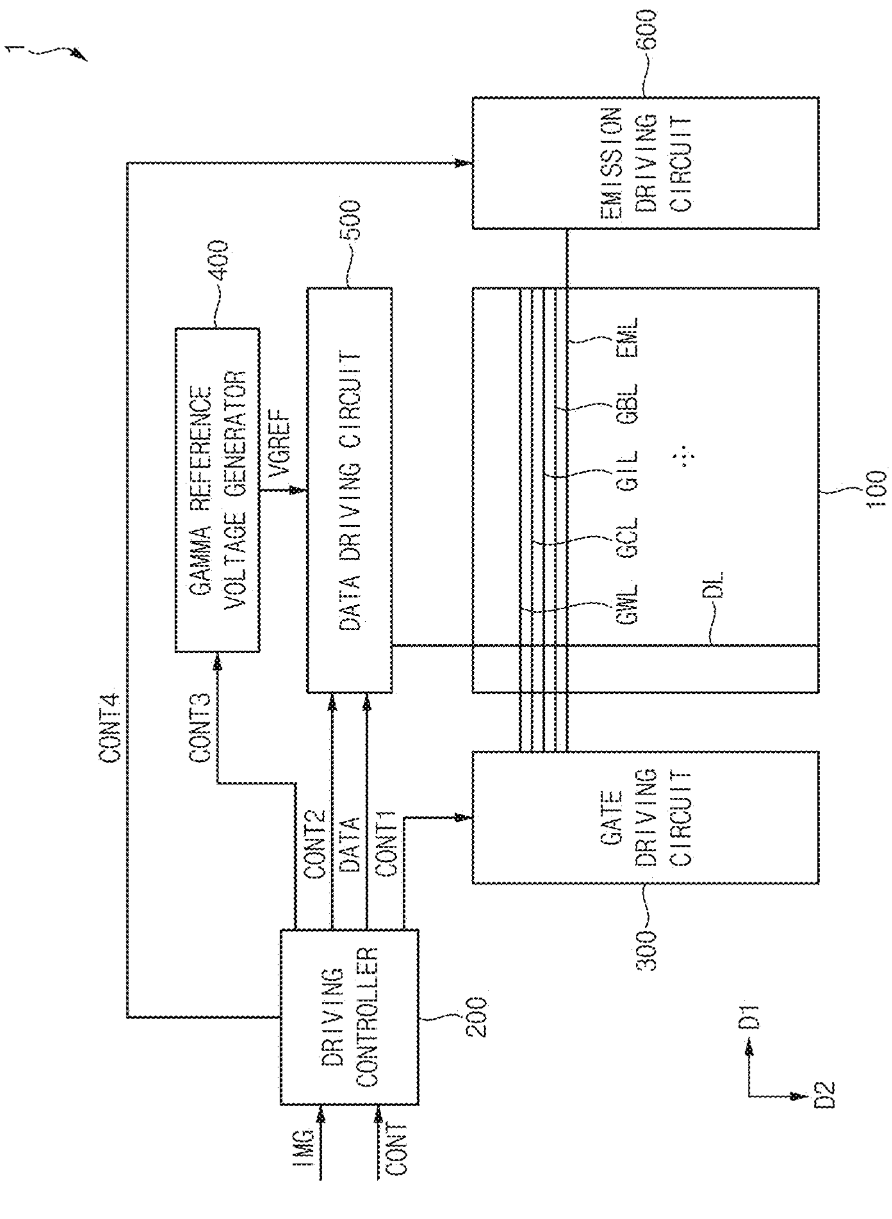
FIG. 1 is a block diagram illustrating a display device according to embodiments of the present invention.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will be understood that when an element is referred to as being "connected to" another element, it can be directly connected to the other element or intervening elements may be present therebetween. In contrast, when an element is referred to as being "directly connected to" another element, there are no intervening elements present.

"About" or "substantially the same" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "substantially the same" can mean within one or more standard deviations, or within ±10%, 5% or 2% of the stated value.

Hereinafter, display devices in accordance with embodiments will be described in more detail with reference to the accompanying drawings. The same reference numerals are used for the same components in the drawings, and redundant descriptions of the same components will be omitted.

FIG. 1 is a block diagram illustrating a display device 1 according to embodiments of the present invention.

Referring to FIG. 1, the display device 1 may include a display panel 100 and a display panel driver. The display panel driver may include a driving controller 200, a gate driving circuit 300, a gamma reference voltage generator 400, a data driving circuit 500, and an emission driving circuit 600.

The display panel 100 may have a display region on which an image is displayed and a peripheral region adjacent to the display region.

The display panel 100 may include a plurality of gate lines GWL, GCL, GIL AND GBL, a plurality of data lines DL, a plurality of emission lines EML and a plurality of pixels electrically connected to the gate lines GWL, GCL, GIL AND GBL, the data lines DL and the emission lines EML. The gate lines GWL, GCL, GIL AND GBL may extend in a first direction D1, the data lines DL may extend in a second direction D2 crossing the first direction D1 and the emission lines EML may extend in the first direction D1.

The driving controller 200 may receive input image data IMG and an input control signal CONT from an external device. For example, the input image data IMG may include red image data, green image data and blue image data. For example, the input image data IMG may further include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driving circuit 300 based on the input control signal CONT, and may output the first control signal CONT1 to the gate driving circuit 300. The first control signal CONT1 may include a vertical start signal and a gate clock signal.

The driving controller 200 may generate the second control signal CONT2 for controlling an operation of the data driving circuit 500 based on the input control signal CONT, and may output the second control signal CONT2 to the data driving circuit 500. The second control signal CONT2 may include a horizontal start signal and a load signal.

The driving controller 200 may generate the data signal DATA based on the input image data IMG. The driving controller 200 may output the data signal DATA to the data driving circuit 500.

The driving controller 200 may generate the third control signal CONT3 for controlling an operation of the gamma reference voltage generator 400 based on the input control signal CONT, and may output the third control signal CONT3 to the gamma reference voltage generator 400.

The driving controller 200 may generate the fourth control signal CONT4 for controlling an operation of the emission driving circuit 600 based on the input control signal CONT, and may output the fourth control signal CONT4 to the emission driving circuit 600.

The gate driving circuit 300 generates gate signals driving the gate lines GWL, GCL, GIL AND GBL in response to the first control signal CONT1 received from the driving controller 200. The gate driving circuit 300 may output the gate signals to the gate lines GWL, GCL, GIL AND GBL.

The gamma reference voltage generator 400 may generate a gamma reference voltage VGREF in response to the third control signal CONT3 received from the driving controller 200. The gamma reference voltage generator 400 may output the gamma reference voltage VGREF to the data driving circuit 500. The gamma reference voltage VGREF may have a value corresponding to the data signal DATA.

In an embodiment, the gamma reference voltage generator 400 may be disposed in the driving controller 200, or in the data driving circuit 500.

The data driving circuit 500 may receive the second control signal CONT2 and the data signal DATA from the driving controller 200, and may receive the gamma reference voltages VGREF from the gamma reference voltage generator 400. The data driving circuit 500 may convert the data signal DATA into a data voltage having an analog type using the gamma reference voltage VGREF. The data driving circuit 500 may output the data voltage to the data lines DL.

For example, the data driving circuit 500 and the driving controller 200 may be implemented as a single integrated circuit, the single integrated circuit may be referred to as a timing controller embedded data driving circuit (TED).

The emission driving circuit 600 may generate emission signals to drive the emission lines EML in response to the fourth control signal CONT4 received from the driving controller 200. The emission driving circuit 600 may output the emission signals to the emission lines EML.

Although the gate driving circuit 300 is disposed at a first side of the display panel 100 and the emission driving circuit 600 is disposed at a second side of the display panel 100 opposite to the first side in FIG. 1 for convenience of explanation, the present invention may not be limited thereto. For example, both of the gate driving circuit 300 and the emission driving circuit 600 may be disposed at the first side of the display panel 100. For example, both of the gate driving circuit 300 and the emission driving circuit 600 may be disposed at both sides of the display panel 100. For example, the gate driving circuit 300 and the emission driving circuit 600 may be integrally formed.

Figure 2:
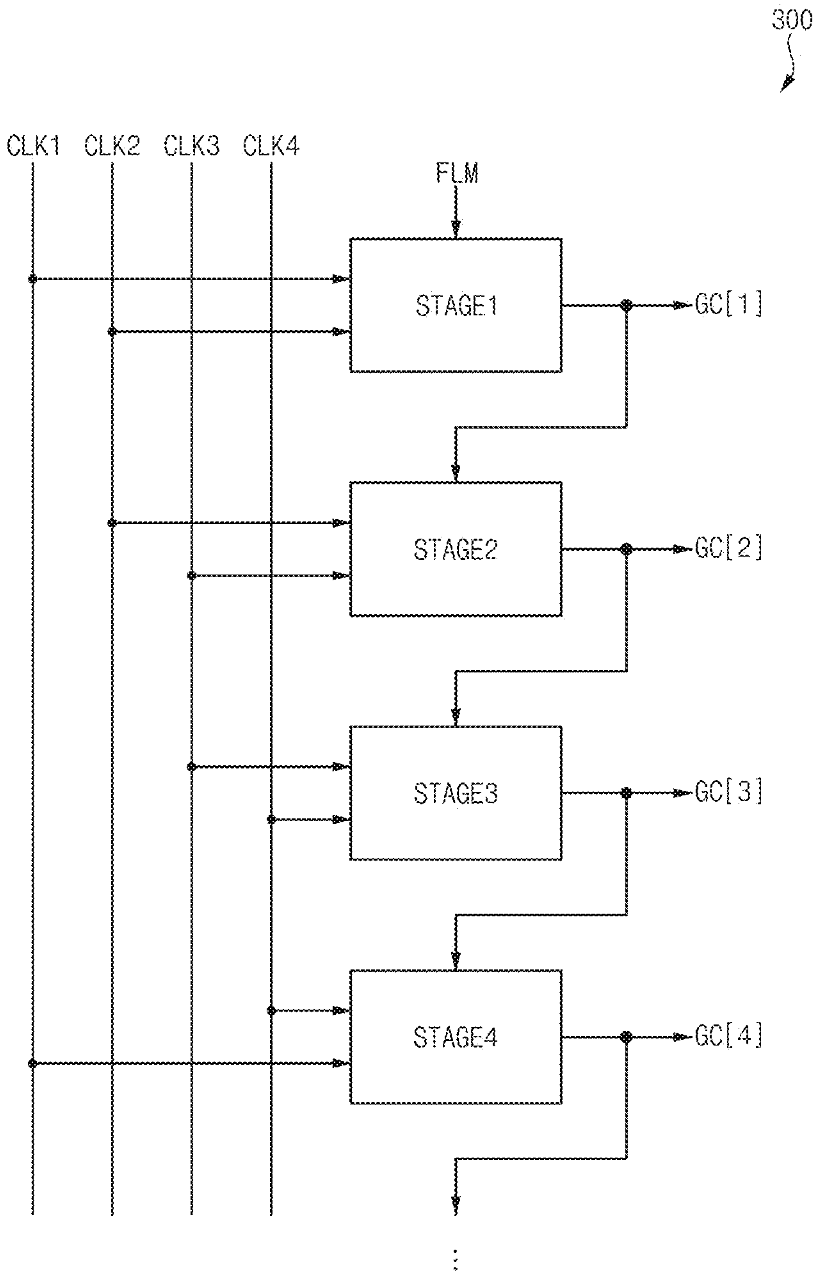
FIG. 2 is a block diagram illustrating a gate driving circuit of the display device of FIG. 1.

FIG. 2 is a block diagram illustrating the gate driving circuit 300 of the display device 1 of FIG. 1.

Referring to FIG. 1 and FIG. 2, the gate driving circuit 300 may include a plurality of stages STAGE1, STAGE2, STAGE3, STAGE4, . . . . Each of the stages STAGE1, STAGE2, STAGE3, STAGE4, . . . may receive two clock signals among a plurality of clock signals CLK1, CLK2, CLK3, CLK4. In addition, each of the stages STAGE1, STAGE2, STAGE3, STAGE4, . . . may receive an input signal FLM or GC[M−1], herein M is an integer greater than or equal to two. Each of the stages STAGE1, STAGE2, STAGE3, STAGE4, . . . may output a gate signal GC[N], herein N is a positive integer, based on the clock signals CLK1, CLK2, CLK3, CLK4 and the input signal FLM or GC[M−1].

For example, a first stage STAGE1 may receive a first clock signal CLK1 and a second clock signal CLK2. The first stage STAGE1 may receive a start signal FLM. The first stage STAGE1 may output a first gate signal GC[1] based on the first clock signal CLK1, the second clock signal CLK2 and the start signal FLM.

For example, a second stage STAGE2 may receive the second clock signal CLK2 and a third clock signal CLK3. The second stage STAGE2 may receive the first gate signal GC[1]. The second stage STAGE2 may output a second gate signal GC[2] based on the second clock signal CLK2, the third clock signal CLK3 and the first gate signal GC[1].

For example, a third stage STAGE3 may receive the third clock signal CLK3 and a fourth clock signal CLK4. The third stage STAGE3 may receive the second gate signal GC[2]. The third stage STAGE3 may output a third gate signal GC[3] based on the third clock signal CLK3, the fourth clock signal CLK4 and the second gate signal GC[2].

For example, a fourth stage STAGE4 may receive the fourth clock signal CLK4 and the first clock signal CLK1. The fourth stage STAGE4 may receive the third gate signal GC[3]. The fourth stage STAGE4 may output a fourth gate signal GC[4] based on the fourth clock signal CLK4, the first clock signal CLK1 and the third gate signal GC[3].

Figure 3:
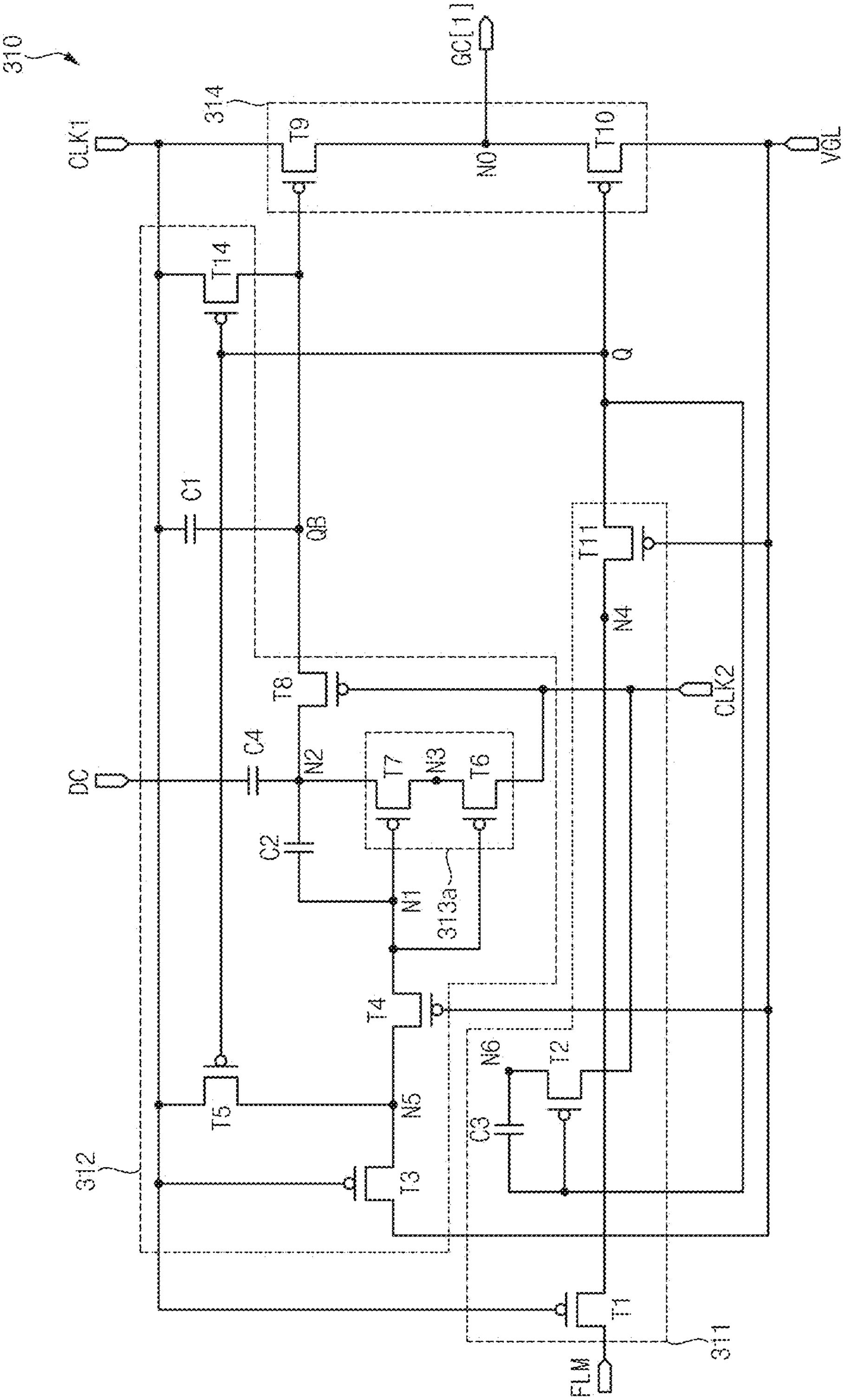
FIG. 3 is a circuit diagram illustrating an embodiment of a stage of the gate driving circuit of FIG. 2.

FIG. 3 is a circuit diagram illustrating an embodiment of a stage 310 of the gate driving circuit 300 of FIG. 2.

Referring to FIGS. 1 to 3, each of the stages STAGE1, STAGE2, STAGE3, STAGE4, . . . may include a plurality of transistors and a plurality of capacitors. For convenience of explanation, it is assumed that the stage 310 is the first stage STAGE1 for receiving the start signal FLM, the first clock signal CLK1 and the second clock signal CLK2 in FIG. 3 among the stages STAGE1, STAGE2, STAGE3, STAGE4, . . . .

The first stage 310 may include a first control circuit 311 for controlling a voltage of a first control node Q. The first stage 310 may further include a second control circuit 312 for controlling a voltage of a second control node QB. The first stage 310 may further include an output circuit 314 for outputting the first clock signal CLK1 or a first voltage VGL as the first gate signal GC[1]. For example, the first voltage VGL may have a first low level. For example, the first voltage VGL may be a constant voltage.

The first control circuit 311 may control the voltage of the first control node Q based on the start signal FLM, the first clock signal CLK1 and the second clock signal CLK2.

The first control circuit 311 may include a first transistor T1, a second transistor T2, an eleventh transistor T11 and a third capacitor C3.

The first transistor T1 may include a control electrode for receiving the first clock signal CLK1, a first electrode for receiving the start signal FLM and a second electrode connected to a fourth node N4.

The second transistor T2 may include a control electrode connected to the first control node Q, a first electrode connected to a sixth node N6 and a second electrode for receiving the second clock signal CLK2.

The eleventh transistor T11 may include a control electrode for receiving the first voltage VGL, a first electrode connected to the fourth node N4 and a second electrode connected to first control node Q.

The third capacitor C3 may include a first electrode connected to the first control node Q and a second electrode connected to the sixth node N6.

The second control circuit 312 may control the voltage of the second control node QB based on the first clock signal CLK1 and the second clock signal CLK2.

The second control circuit 312 may include third to fifth transistors T3, T4, and T5, a switching circuit 313*a*, a fourteenth transistor T14, an eighth transistor T8, a first capacitor C1, a second capacitor C2 and a fourth capacitor C4.

The switching circuit 313*a* may include a sixth transistor T6 and a seventh transistor T7.

The third transistor T3 may include a control electrode for receiving the first clock signal CLK1, a first electrode for receiving the first voltage VGL and a second electrode connected to a fifth node N5.

The fourth transistor T4 may include a control electrode for receiving the first voltage VGL, a first electrode connected to the fifth node N5 and a second electrode connected to a first node N1.

The fifth transistor T5 may include a control electrode connected to the first control node Q, a first electrode for receiving the first clock signal CLK1 and a second electrode connected to the fifth node N5.

The sixth transistor T6 may include a control electrode connected to the first node N1, a first electrode connected to a third node N3 and a second electrode for receiving the second clock signal CLK2.

The seventh transistor T7 may include a control electrode connected to the first node N1, a first electrode connected to a second node N2 and a second electrode connected to the third node N3.

The eighth transistor T8 may include a control electrode for receiving the second clock signal CLK2, a first electrode connected to the second node N2 and a second electrode connected to the second control node QB.

The fourteenth transistor T14 may include a control electrode connected to the first control node Q, a first electrode for receiving the first clock signal CLK1 and a second electrode connected to the second control node QB.

The first capacitor C1 may include a first electrode for receiving the first clock signal CLK1 and a second electrode connected to the second control node QB.

The second capacitor C2 may include a first electrode connected to the first node N1 and a second electrode connected to the second node N2.

The fourth capacitor C4 may include a first electrode for receiving a second voltage DC and a second electrode connected to the second node N2.

For example, the second voltage DC may be a constant voltage. For example, the second voltage DC may be less than the first voltage VGL.

A structure in which the control electrode of the sixth transistor T6 and the control electrode of the seventh transistor T7 are connected to each other and the first electrode of the sixth transistor T6 and the second electrode of the seventh transistor T7 are connected to each other may be referred to as a dual transistor structure.

The dual transistor structure prevents a current leakage, so that a reliability and a stability of the gate driving circuit 300 may be improved.

The output circuit 314 may output the first clock signal CLK1 or the first voltage VGL as the first gate signal GC[1] based on the voltage of the first control node Q and the voltage of the second control node QB.

The output circuit 314 may include a ninth transistor T9 and a tenth transistor T10.

The ninth transistor T9 may include a control electrode connected to the second control node QB, a first electrode for receiving the first clock signal CLK1 and a second electrode connected to an output node NO.

The tenth transistor T10 may include a control electrode connected to the first control node Q, a first electrode connected to the output node NO and a second electrode for receiving the first voltage VGL.

In an embodiment, the first stage 310 may include a first type transistor and/or a second type transistor which is different from the first type transistor. For example, the first type transistor may be a P-type metal oxide semiconductor (PMOS) transistor, and the second type transistor may be an N-type metal oxide semiconductor (NMOS) transistor. In an embodiment, the first stage 310 may include only the PMOS transistors.

Although the first stage 310 is illustrated to include only the PMOS transistor in FIG. 3, the present invention is not limited thereto. For another example, some transistors of the first stage 310 may be the NMOS transistors and other transistors of the first stage 310 may be the PMOS transistors.

The fourth capacitor C4 may store a voltage which is a difference between the second voltage DC and a voltage of the second node N2. The voltage of the second node N2 may be maintained at a constant voltage by the second voltage DC applied to the first electrode of the fourth capacitor C4 and the voltage which is stored in the fourth capacitor C4. Accordingly, the voltage of the second node N2 may not be changed by a coupling of the second capacitor C2. When the voltage of the second node N2 is maintained at the constant voltage, the second clock signal CLK2 which is transmitted to the second node N2 may stably maintain a voltage having a high level. Accordingly, the second stage STAGE2 for outputting the second clock signal CLK2 as the second gate signal GC[2] may stably output the second gate signal GC[2]. Accordingly, the stability and the reliability of the gate driving circuit 300 may be improved.

Figure 4:
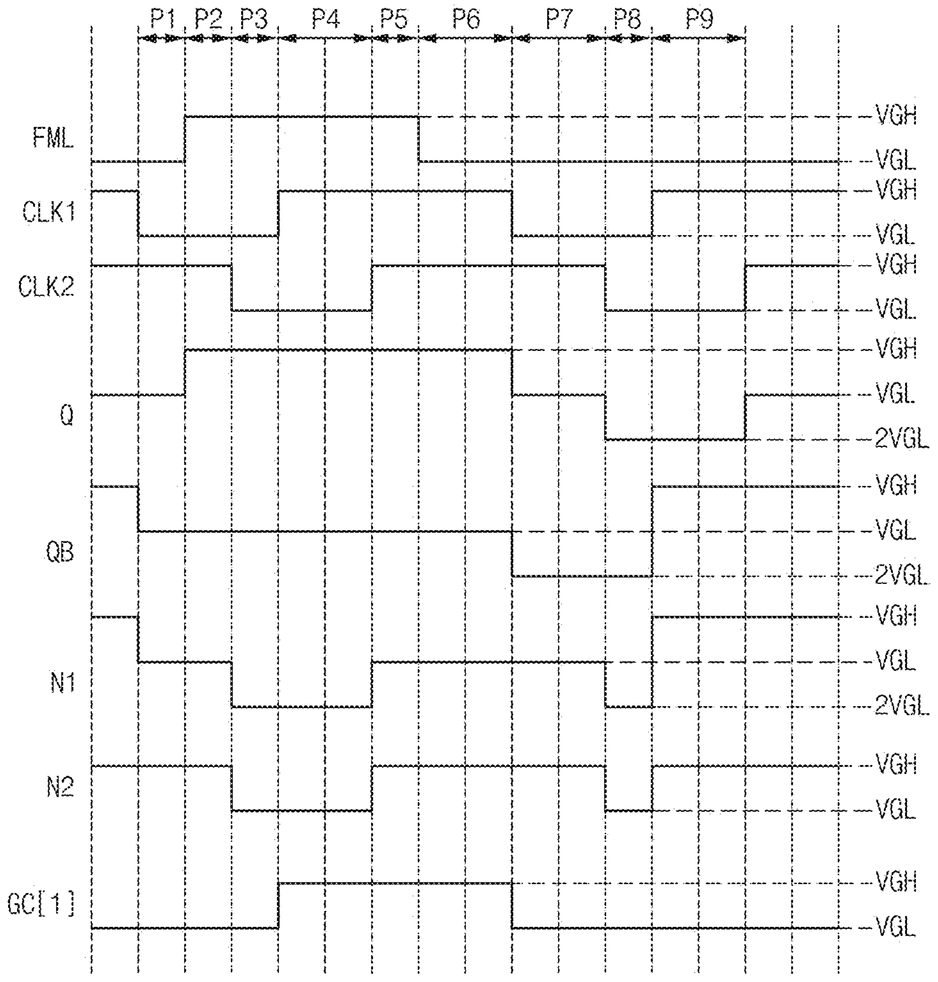
FIG. 4 is a timing diagram illustrating an operation of the stage of FIG. 3.

FIG. 4 is a timing diagram illustrating an operation of the stage 310 of FIG. 3.

Referring to FIGS. 3 and 4, an operation period of the stage 310 may include first to ninth periods P1 to P9.

In the first period P1, a level of the start signal FLM may be the first low level (e.g. VGL). A level of the first clock signal CLK1 may be the first low level. A level of the second clock signal CLK2 may be the high level (e.g. VGH).

The first transistor T1 may be turned on in response to the first clock signal CLK1. The first transistor T1 may transmit the start signal FLM to the fourth node N4. The eleventh transistor T11 may be turned on by the first voltage VGL. The eleventh transistor T11 may transmit a voltage of the fourth node N4 to the first control node Q. That is, the start signal FLM having the first low level may be transmitted to the first control node Q.

The voltage of the first control node Q and the first clock signal CLK1 may have the first low level, so that a difference between a voltage of the control electrode of the fourteenth transistor T14 and a voltage of the first electrode of the fourteenth transistor T14 may be less than a magnitude of a threshold voltage of the fourteenth transistor T14. Accordingly, the fourteenth transistor T14 may be turned off.

When the level of the first clock signal CLK1 decreases from the high level to the first low level, a level of the voltage of the second control node QB may decrease to the first low level by a coupling of the first capacitor C1. That is, the voltage of the second control node QB may have the first low level. Accordingly, a voltage of the first electrode of the first capacitor C1 and the voltage of the second control node QB may have the first low level (e.g. VGL).

In addition, the voltage of the second control node QB and the first clock signal CLK1 have the first low level, so that a difference between a voltage of the control electrode of the ninth transistor T9 and a voltage of the first electrode of the ninth transistor T9 may be less than a magnitude of a threshold voltage of the ninth transistor T9. Accordingly, the ninth transistor may be turned off.

The fifth transistor T5 may be turned on by the voltage of the first control node Q. The fifth transistor T5 may transmit the first clock signal CLK1 to the fifth node N5. The fourth transistor T4 may be turned on by the first voltage VGL. The fourth transistor T4 may transmit a voltage of the fifth node N5 to the first node N1. Accordingly, a voltage of the first node N1 may have the first low level.

The sixth transistor T6 and the seventh transistor T7 may be turned on by the voltage of the first node N1. The sixth transistor T6 and the seventh transistor T7 may transmit the second clock signal CLK2 to the second node N2. Accordingly, the voltage of the second node N2 may have the high level. The second capacitor C2 may store a voltage which is a difference between the voltage of the first node N1 and the voltage of the second node N2. That is, the second capacitor C2 may store a voltage having a level which is a difference between the high level and the first low level. For example, the second capacitor C2 may store a voltage having a magnitude of VGH-VGL.

The tenth transistor T10 may be turned on by the voltage of the first control node Q. The tenth transistor T10 may transmit the first voltage VGL to the output node NO. Accordingly, the first stage 310 may output a voltage having the first low level as the first gate signal GC[1].

In the second period P2, the start signal FLM may have the high level. The first clock signal CLK1 may have the first low level. The second clock signal CLK2 may have the high level.

The first transistor T1 may be turned on by the first clock signal CLK1. The eleventh transistor T11 may be turned on by the first voltage VGL. The first transistor T1 and the eleventh transistor T11 may transmit the start signal FLM to the first control node Q. The voltage of the first control node Q may have the high level.

The fourteenth transistor T14 may be turned off by the voltage of the first control node Q. The eighth transistor T8 may be turned off by the second clock signal CLK2. Accordingly, the voltage of the second control node QB may maintain the first low level by the first capacitor C1.

The third transistor T3 may be turned on by the first clock signal CLK1. The fourth transistor T4 may be turned on by the first voltage VGL. The third transistor T3 and the fourth transistor T4 may transmit the first voltage VGL to the first node N1. Accordingly, the voltage of the first node N1 may have the first low level.

The sixth transistor T6 and the seventh transistor T7 may be turned on by the voltage of the first node N1. The sixth transistor T6 and the seventh transistor T7 may transmit the second clock signal CLK2 to the second node N2. Accordingly, the voltage of the second node N2 may have the high level.

The second capacitor C2 may store the voltage which is the difference between the voltage of the first node N1 and the voltage of the second node N2. That is, the second capacitor C2 may store the voltage having the level which is the difference between the high level and the first low level. For example, the second capacitor C2 may store the voltage having the magnitude of VGH-VGL.

The ninth transistor T9 may be turned on by the voltage of the second control node QB. The ninth transistor T9 may transmit the first clock signal CLK1 to the output node NO. Accordingly, the first stage 310 may output the voltage having the first low level as the first gate signal GC[1].

In the third period P3, the start signal FLM may have the high level. The first clock signal CLK1 may have the first low level. The second clock signal CLK2 may have the first low level.

The first transistor T1 may be turned on by the first clock signal CLK1. The eleventh transistor T11 may be turned on by the first voltage VGL. The first transistor T1 and the eleventh transistor T11 may transmit the start signal FLM to the first control node Q. The voltage of the first control node Q may have the high level.

The third transistor T3 may be turned on by the first clock signal CLK1. The fourth transistor T4 may be turned on by the first voltage VGL. The third transistor T3 and the fourth transistor T4 may transmit the first voltage VGL to the first node N1. Accordingly, the voltage of the first node N1 may have the first low level.

The sixth transistor T6 and the seventh transistor T7 may be turned on by the voltage of the first node N1. The sixth transistor T6 and the seventh transistor T7 may transmit the second clock signal CLK2 to the second node N2. Accordingly, the voltage of the second node N2 may have the first low level.

When a level of the voltage of the second node N2 decreases from the high level to the first low level, the voltage of the first node N1 may be bootstrapped to a voltage having a second low level (e.g. 2VGL) by the coupling of the second capacitor C2.

The eighth transistor T8 may be turned on by the second clock signal CLK2. The eighth transistor T8 may transmit the voltage of the second node N2 to the second control node QB. Accordingly, the voltage of the second control node QB may have the first low level. The voltage of the first electrode of the first capacitor C1 and a voltage of the second electrode of the first capacitor C1 may have the first low level.

The ninth transistor T9 may be turned on by the voltage of the second control node QB. The ninth transistor T9 may transmit the first clock signal CLK1 to the output node NO. Accordingly, the first stage 310 may output the voltage having the first low level as the first gate signal GC[1].

In the fourth period P4, the start signal FLM may have the high level. The first clock signal CLK1 may have the high level. The second clock signal CLK2 may have the first low level.

The first transistor T1 may be turned off by the first clock signal CLK1. The voltage of the first control node Q may maintain the high level.

The third transistor T3 and the fifth transistor T5 may be turned off by the voltage of the first control node Q and the first clock signal CLK1. The voltage of the first node N1 may maintain the second low level by the second capacitor C2.

The sixth transistor T6 and the seventh transistor T7 may be turned on by the voltage of the first node N1. The sixth transistor T6 and the seventh transistor T7 may transmit the second clock signal CLK2 to the second node N2. Accordingly, the voltage of the second node N2 may have the first low level.

The eighth transistor T8 may be turned on by the second clock signal CLK2. The eighth transistor T8 may transmit the voltage of the second node N2 to the second control node QB. Accordingly, the voltage of the second control node QB may have the first low level.

The ninth transistor T9 may be turned on by the voltage of the second control node QB. The ninth transistor T9 may transmit the first clock signal CLK1 to the output node NO. Accordingly, the first stage 310 may output a voltage having the high level as the first gate signal GC[1].

In the fifth period P5, the start signal FLM may have the high level. The first clock signal CLK1 may have the high level. The second clock signal CLK2 may have the high level.

The first transistor T1 may be turned on by the first clock signal CLK1. The voltage of the first control node Q may maintain the high level.

The sixth transistor T6 and the seventh transistor T7 may be turned on by the voltage of the first node N1 maintaining the second low level by the second capacitor C2. The sixth transistor T6 and the seventh transistor T7 may transmit the second clock signal CLK2 to the second node N2. Accordingly, the voltage of the second node N2 may have the high level.

The third transistor T3 and the fifth transistor T5 may be turned off by the voltage of the first control node Q and the first clock signal CLK1. When the level of the voltage of the second node N2 increases from the first low level to the high level, the level of the voltage of the first node N1 may increase from the second low level (e.g. 2VGL) to the first low level (e.g. VGL) by the coupling of the second capacitor C2.

The fourteenth transistor T14 may be turned off by the voltage of the first control node Q. The eighth transistor T8 may be turned off by the second clock signal CLK2. Accordingly, the voltage of the second control node QB may maintain the first low level by the first capacitor C1.

The ninth transistor T9 may be turned on by the voltage of the second control node QB. The ninth transistor T9 may transmit the first clock signal CLK1 to the output node NO. Accordingly, the first stage 310 may output the voltage having the high level as the first gate signal GC[1].

In the sixth period P6, the start signal FLM may have the first low level. The first clock signal CLK1 may have the high level. The second clock signal CLK2 may have the high level.

The first transistor T1 may be turned off by the first clock signal CLK1. The voltage of the first control node Q may maintain the high level.

The sixth transistor T6 and the seventh transistor T7 may be turned on by the voltage of the first node N1. The sixth transistor T6 and the seventh transistor T7 may transmit the second clock signal CLK2 to the second node N2. Accordingly, the voltage of the second node N2 may have the high level.

The third transistor T3 and the fifth transistor T5 may be turned off by the voltage of the first control node Q and the first clock signal CLK1. The voltage of the first node N1 may maintain the first low level (e.g. VGL).

The fourteenth transistor T14 may be turned off by the voltage of the first control node Q. The eighth transistor T8 may be turned off by the second clock signal CLK2. Accordingly, the voltage of the second control node QB may maintain the first low level by the first capacitor C1.

The ninth transistor T9 may be turned on by the voltage of the second control node QB. The ninth transistor T9 may transmit the first clock signal CLK1 to the output node NO. Accordingly, the first stage 310 may output the voltage having the high level as the first gate signal GC[1].

In the seventh period P7, the start signal FLM may have the first low level. The first clock signal CLK1 may have the first low level. The second clock signal CLK2 may have the high level.

The first transistor T1 may be turned on by the first clock signal CLK1. The eleventh transistor T11 may be turned on by the first voltage VGL. The first transistor T1 and the eleventh transistor T11 may transmit the start signal FLM to the first control node Q. Accordingly, the voltage of the first control node Q may have the first low level.

When the level of the first clock signal CLK1 decreases from the high level to the first low level, the voltage of the second control node QB may be bootstrapped to a voltage having the second low level by the coupling of the first capacitor C1. Accordingly, the voltage of the first electrode of the first capacitor C1 may have the first low level and the voltage of the second control node QB may have the second low level.

The voltage of the first control node Q and the first clock signal CLK1 have the first low level, so that the difference between the voltage of the control electrode of the fourteenth transistor T14 and the voltage of the first electrode of the fourteenth transistor T14 may be less than the magnitude of the threshold voltage of the fourteenth transistor T14. Accordingly, the fourteenth transistor T14 may be turned off. In addition, the first clock signal CLK1 has the first low level and the voltage of the second control node QB has the second low level, so that the difference between the voltage of the control electrode of the ninth transistor T9 and the voltage of the first electrode of the ninth transistor T9 may be greater than the magnitude of the threshold voltage of the ninth transistor T9. Accordingly, the ninth transistor T9 may be turned on. Accordingly, the ninth transistor T9 may transmit the first clock signal CLK1 having the first low level to the output node NO.

The fifth transistor T5 may be turned on by the voltage of the first control node Q. The fifth transistor T5 may transmit the first clock signal CLK1 to the fifth node N5. The fourth transistor T4 may be turned on by the first voltage VGL. The fourth transistor T4 may transmit the voltage of the fifth node N5 to the first node N1. Accordingly, the voltage of the first node N1 may have the first low level.

The sixth transistor T6 and the seventh transistor T7 may be turned on by the voltage of the first node N1. The sixth transistor T6 and the seventh transistor T7 may transmit the second clock signal CLK2 to the second node N2. Accordingly, the voltage of the second node N2 may have the high level. The second capacitor C2 may store the voltage which is the difference between the voltage of the first node N1 and the voltage of the second node N2. That is, the second capacitor C2 may store the voltage having the level which is the difference between the high level and the first low level. For example, the second capacitor C2 may store the voltage having the magnitude of VGH-VGL The second transistor T2 may be turned on by the voltage of the first control node Q. The second transistor T2 may transmit the second clock signal CLK2 to the sixth node N6. Accordingly, a voltage of the sixth node N6 may have the high level. Accordingly, the third capacitor C3 may store a voltage which is a difference between the voltage of the first control node Q and the voltage of the sixth node N6. That is, the third capacitor C3 may store a voltage having a level which is the difference between the high level and the first low level. For example, the third capacitor C3 may store the voltage having the magnitude of VGH-VGL. The tenth transistor T10 may be turned on by the voltage of the first control node Q. The tenth transistor T10 may transmit the first voltage VGL to the output node NO.

Accordingly, the first clock signal CLK1 having the first low level and the first voltage VGL are transmitted to the output node NO, so that the first stage 310 may output the voltage having the first low level as the first gate signal GC[1].

In the eighth period P8, the start signal FLM may have the first low level. The first clock signal CLK1 may have the first low level. The second clock signal CLK2 may have the first low level.

The second transistor T2 may be turned on by the voltage of the first control node Q. The second transistor T2 may transmit the second clock signal CLK2 to the sixth node N6. The voltage of the sixth node N6 may have the first low level. When a level of the voltage of the sixth node N6 decreases from the high level to the first low level, the voltage of the first control node Q may be bootstrapped to the voltage having the second low level by a coupling of the third capacitor C3.

The sixth transistor T6 and the seventh transistor T7 may be turned on by the voltage of the first node N1. The sixth transistor T6 and the seventh transistor T7 may transmit the second clock signal CLK2 to the second node N2. Accordingly, the voltage of the second node N2 may have the first low level.

When the level of the voltage of the second node N2 decreases from the high level to the low level, the voltage of the first node N1 may be bootstrapped to the voltage having the second low level by the coupling of the second capacitor C2.

The fourteenth transistor T14 may be turned on by the voltage of the first control node Q. In addition, the voltage of the second control node QB may maintain the second low level by the first capacitor C1.

The voltage of the second control node QB has the second low level and the first clock signal CLK1 has the first low level, so that the difference between the voltage of the control electrode of the ninth transistor T9 and the voltage of the first electrode of the ninth transistor T9 may be greater than the magnitude of the threshold voltage of the ninth transistor T9. Accordingly, the ninth transistor T9 may be turned on. Accordingly, the ninth transistor T9 may transmit the first clock signal CLK1 having the first low level to the output node NO.

The tenth transistor T10 may be turned on by the voltage of the first control node Q. The tenth transistor T10 may transmit the first voltage VGL to the output node NO.

Accordingly, the first clock signal CLK1 having the first low level and the first voltage VGL is transmitted to the output node NO, so that the first stage 310 may output the voltage having the first low level as the first gate signal GC[1].

In the ninth period P9, the start signal FLM may have the first low level. The first clock signal CLK1 may have the high level. The second clock signal CLK2 may have the first low level.

The first transistor T1 may be turned off by the first clock signal CLK1. The first control node Q may maintain the second low level.

The fourteenth transistor T14 may be turned on by the voltage of the first control node Q. The fourteenth transistor T14 may transmit the first clock signal CLK1 to the second control node QB. Accordingly, the voltage of the second control node QB may have the high level.

The fifth transistor T5 may be turned on by the voltage of the first control node Q. The fourth transistor T4 may be turned on by the first voltage VGL. The fourth transistor T4 and the fifth transistor T5 may transmit the first clock signal CLK1 to the first node N1. Accordingly, the voltage of the first node N1 may have the high level.

The sixth transistor T6 and the seventh transistor T7 may be turned off by the voltage of the first node. The eighth transistor T8 may be turned on by the second clock signal CLK2. The eighth transistor T8 may transmit the voltage of the second control node QB to the second node N2. Accordingly, the voltage of the second node N2 may have the high level. The voltage of the first electrode of the second capacitor C2 and the voltage of the second electrode of the second capacitor C2 may have the high level (e.g. VGH).

The tenth transistor T10 may be turned on by the voltage of the first control node Q. The tenth transistor T10 may transmit the first voltage VGL to the output node NO. Accordingly, the first stage 310 may output the voltage having the first low level as the first gate signal GC[1].

The fourth capacitor C4 may store the voltage which is the difference between the second voltage DC and the voltage of the second node N2. The voltage of the second node N2 may be maintained at the constant voltage by the second voltage DC applied to the first electrode of the fourth capacitor C4 and the voltage which is stored in the fourth capacitor C4. Accordingly, the voltage of the second node N2 may not be changed by the coupling of the second capacitor C2. For example, when the level of the voltage of the first node N1 decreases from the high level to the first low level by the first clock signal CLK1 in the first period P1, the voltage of the second node N2 may be prevented from temporarily decreasing by the coupling of the second capacitor C2. When the voltage of the second node N2 is maintained at the constant voltage, the second clock signal CLK2 which is transmitted to the second node N2 may stably maintain the high level. Accordingly, the second stage STAGE2 for outputting the second clock signal CLK2 as the second gate signal GC[2] may stably output the second gate signal GC[2]. Accordingly, the stability and the reliability of the gate driving circuit 300 may be improved.

Figure 5:
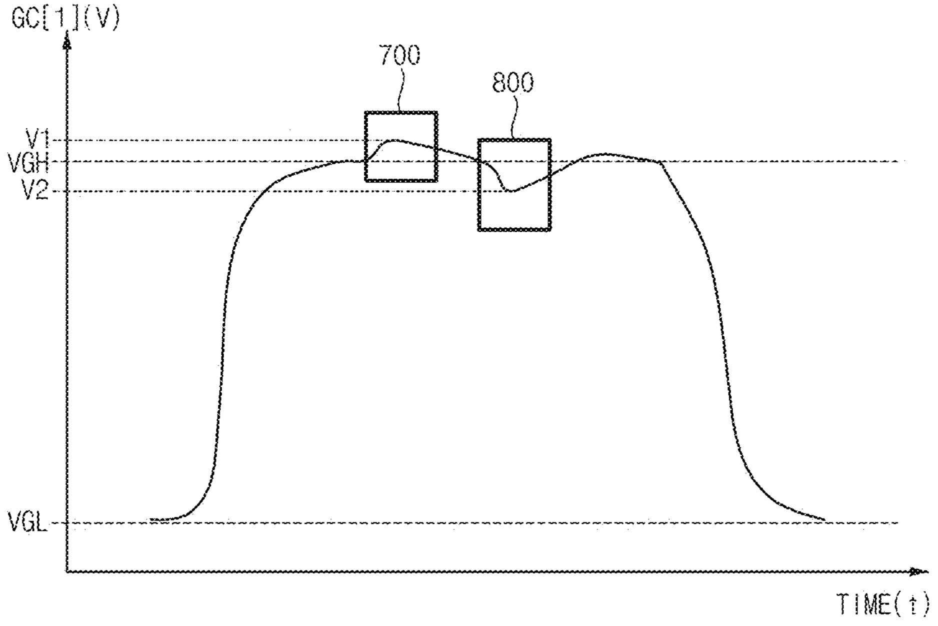
FIG. 5 is a diagram illustrating a gate signal output from the stage of FIG. 3.
Figure 6:
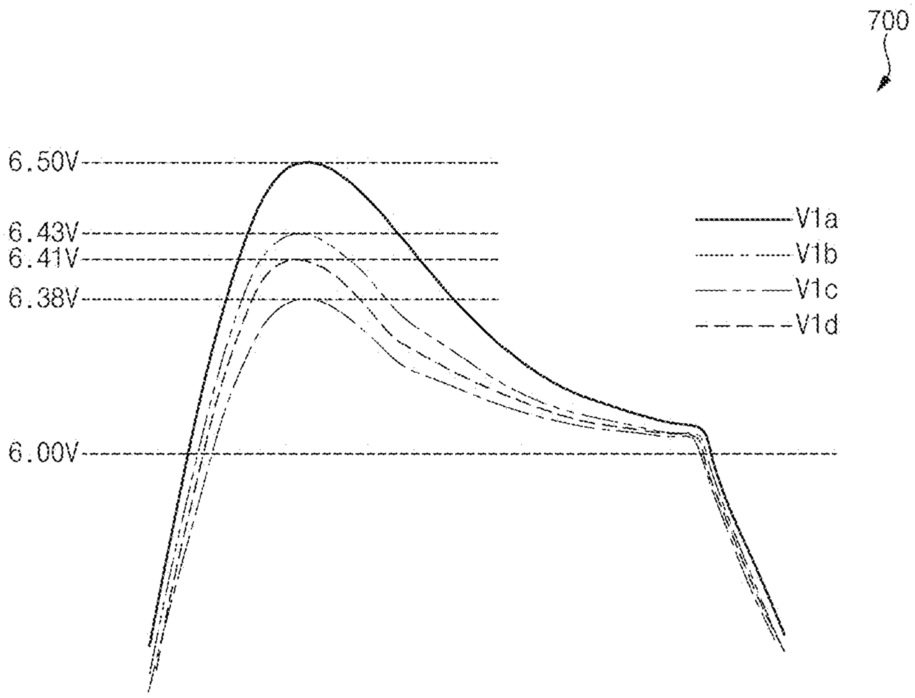
FIG. 6 is a diagram illustrating a maximum value of a voltage of the gate signal of FIG. 5 having a high level according to a capacitance.
Figure 7:
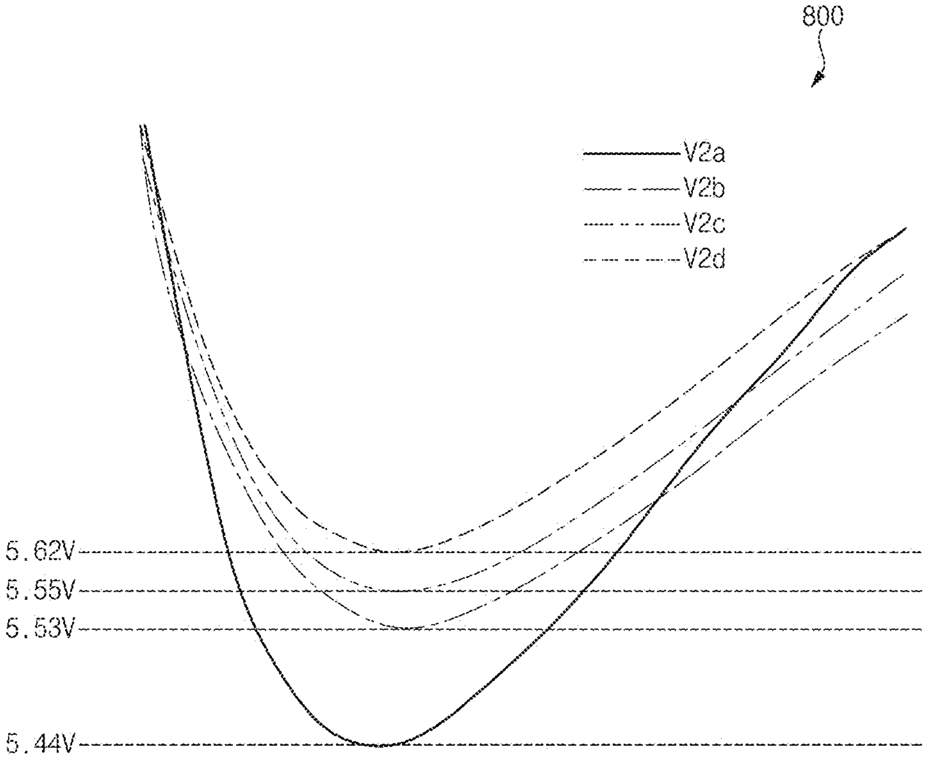
FIG. 7 is a diagram illustrating a minimum value of the voltage of the gate signal of FIG. 5 having the high level according to the capacitance.

FIG. 5 is a diagram illustrating the gate signal output GC[1] from the stage 310 of FIG. 3. FIG. 6 is a diagram illustrating a maximum value of a voltage of the gate signal GC[1] of FIG. 5 having the high level according to a capacitance. FIG. 7 is a diagram illustrating a minimum value of the voltage of the gate signal GC[1] of FIG. 5 having the high level according to the capacitance.

Referring to FIGS. 3 to 5, the first gate signal GC[1] of the first stage 310 may have the high level in the fourth period P4 to the sixth period P6. The voltage having the high level of the first gate signal GC[1] may swing between a maximum voltage V1 and a minimum voltage V2 in the fourth period P4 to the sixth period P6.

As the maximum voltage V1 and the minimum voltage V2 are closer to a reference high voltage VGH, the first stage 310 may stably output the first gate signal GC[1]. Accordingly, the stability and the reliability of the gate driving circuit 300 may be improved.

Referring to FIGS. 3 to 6, the first gate signal GC[1] may have the maximum voltage V1 in a first maximum period 700.

The maximum voltage V1 may be changed according to the capacitance of each of the first capacitors C1 to the fourth capacitor C4. The reference high voltage VGH may be 6.0 voltages (V).

A conventional gate driving circuit may only include the first capacitor C1, the second capacitor C2 and the third capacitor C3. The capacitance of the second capacitor C2 may be 70 farads (F). The maximum voltage V1 may be a first maximum voltage Vla. The first maximum voltage Vla may be 6.5V.

In an embodiment, the capacitance of the second capacitor C2 may be 35 F, the capacitance of the fourth capacitor C4 may be 140 F. The maximum voltage V1 may be a second maximum voltage V1*b*. The second maximum voltage V1*b* may be 6.38V. A magnitude of the maximum voltage V1 may decrease compared to the conventional gate driving circuit. That is, the second maximum voltage V1*b* may be closer to the reference high voltage VGH than the first maximum voltage Vla. The stability of the first gate signal GC[1] may be improved. Accordingly, the stability and the reliability of the gate driving circuit 300 may be improved.

In an embodiment, the capacitance of the second capacitor C2 may be 17.5 F, the capacitance of the fourth capacitor C4 may be 70 F. The maximum voltage V1 may be a third maximum voltage V1*c*. The third maximum voltage V1*c* may be 6.43V. The magnitude of the maximum voltage V1 may decrease compared to the conventional gate driving circuit. That is, the third maximum voltage V1*c* may be closer to the reference high voltage VGH than the first maximum voltage Vla. The stability of the first gate signal GC[1] may be improved. Accordingly, the stability and the reliability of the gate driving circuit 300 may be improved.

In an embodiment, the capacitance of the second capacitor C2 may be 10 F, the capacitance of the fourth capacitor C4 may be 70 F. The maximum voltage V1 may be a fourth maximum voltage V1*d*. The fourth maximum voltage Vld may be 6.41V. The magnitude of the maximum voltage V1 may decrease compared to the conventional gate driving circuit. That is, the fourth maximum voltage Vld may be closer to the reference high voltage VGH than the first maximum voltage Vla. In addition, as the capacitance of the third capacitor C3 decreases, a time for charging or discharging the third capacitor C3 may decrease. Accordingly, a load which is applied to the second clock signal CLK2 may decrease. The stability of the first gate signal GC[1] may be improved. Accordingly, the stability and the reliability of the gate driving circuit 300 may be improved.

In an embodiment, the capacitance of the second capacitor C2 may be 70 F, the capacitance of the fourth capacitor C4 may be 70 F. The maximum voltage V1 may be 6.44V. The magnitude of the maximum voltage V1 may decrease compared to the conventional gate driving circuit. That is, the maximum voltage V1 may be closer to the reference high voltage VGH than the first maximum voltage Vla. The stability of the first gate signal GC[1] may be improved. Accordingly, the stability and the reliability of the gate driving circuit 300 may be improved.

In an embodiment, the capacitance of the second capacitor C2 may be 70 F, the capacitance of the fourth capacitor C4 may be 140 F. The maximum voltage V1 may be 6.39V. The magnitude of the maximum voltage V1 may decrease compared to the conventional gate driving circuit. That is, the maximum voltage V1 may be closer to the reference high voltage VGH than the first maximum voltage Vla. The stability of the first gate signal GC[1] may be improved. Accordingly, the stability and the reliability of the gate driving circuit 300 may be improved.

Referring to FIGS. 3 to 5 and 7, the first gate signal GC[1] may have a minimum voltage V2 in a second maximum period 800.

The minimum voltage V2 may be changed according to the capacitance of each of the first capacitor C1 to the fourth capacitor C4. The reference high voltage may be 6.0V.

In an embodiment, as a ratio of the capacitance of the second capacitor C2 and the capacitance of the fourth capacitor C4 decreases, the minimum voltage V2 may be closer to the reference high voltage VGH.

A magnitude of the voltage stored in the fourth capacitor C4 may be calculated by VC4=(DC-Va)*(CF2/(CF2+CF4)). Herein, the VC4 means the voltage stored in the fourth capacitor C4. DC means the second voltage DC. Va means the voltage of the first node N1. CF2 means the capacitance of the second capacitor C2, and CF4 means the capacitance of the fourth capacitor C4.

When the voltage of the first node N1 is changed, an amount of change of the voltage stored in the fourth capacitor C4 may be calculated as AVC4=ΔVa*(CF2/(CF2+CF4)). Herein, ΔVa means the amount of change of the voltage of the first node N1 and ΔVC4 means the amount of change of the voltage stored in the fourth capacitor C4. As the amount of change of the voltage stored in the fourth capacitor C4 decreases, an amount of change of the voltage of the second node N2 may decrease. When the amount of change of the voltage of the second node N2 decreases, the stability of the second clock signal CLK2 and the stability of the first gate signal GC[1] may be improved. For example, as the amount of change of the voltage of the second node N2 decreases, the minimum voltage V2 of the first gate signal GC[1] may be closer to the reference high voltage VGH. Accordingly, as the capacitance of the second capacitor C2 decreases and the capacitance of the fourth capacitor C4 increases, the amount of change of the voltage of the second node N2 may decrease. Thus, the stability of the second clock signal CLK2 and the stability of the first gate signal GC[1] may be improved.

The conventional gate driving circuit may only include the first capacitor C1, the second capacitor C2 and the third capacitor C3. The capacitance of the second capacitor C2 may be 70 F. The minimum voltage V2 may be a first minimum voltage V2*a*. The first minimum voltage V2*a* may be 5.44 V.

In an embodiment, the capacitance of the second capacitor C2 may be 35 F, the capacitance of the fourth capacitor C4 may be 140 F. The minimum voltage V2 may be a second minimum voltage V2*b*. The second minimum voltage V2*b* may be 5.53V. A magnitude of the minimum voltage V2 may increase compared to the conventional gate driving circuit. That is, the second minimum voltage V2*b* may be closer to the reference high voltage VGH than the first minimum voltage V2*a*. The stability of the first gate signal GC[1] may be improved. Accordingly, the stability and the reliability of the gate driving circuit 300 may be improved.

In an embodiment, the capacitance of the second capacitor C2 may be 17.5 F, the capacitance of the fourth capacitor C4 may be 70 F. The minimum voltage V2 may be a third minimum voltage V2*c*. The third minimum voltage V2*c* may be 5.55V. The magnitude of the minimum voltage V2 may increase compared to the conventional gate driving circuit. That is, the third minimum voltage V2*c* may be closer to the reference high voltage VGH than the first minimum voltage V2*a*. The stability of the first gate signal GC[1] may be improved. Accordingly, the stability and the reliability of the gate driving circuit 300 may be improved.

In an embodiment, the capacitance of the second capacitor C2 may be 10 F, the capacitance of the fourth capacitor C4 may be 70 F. The minimum voltage V2 may be a fourth minimum voltage V2*d*. The fourth minimum voltage V2*d* may be 5.62V. The magnitude of the minimum voltage V2 may increase compared to the conventional gate driving circuit. That is, the fourth minimum voltage V2*d* may be closer to the reference high voltage VGH than the first minimum voltage V2*a*. In addition, as the capacitance of the third capacitor C3 decreases, the time for charging or discharging the third capacitor C3 may decrease. Accordingly, the load which is applied to the second clock signal CLK2 may decrease. That is, the stability of the first gate signal GC[1] may be improved. Accordingly, the stability and the reliability of the gate driving circuit 300 may be improved.

In an embodiment, when the ratio of the capacitance of the second capacitor C2 and the capacitance of the fourth capacitor C4 is less than or equal to 0.25, the maximum voltage V1 and the minimum voltage V2 may be closer to the reference high voltage VGH. That is, the stability of the first gate signal GC[1] may be improved. In addition, when the ratio of the capacitance of the second capacitor C2 and the capacitance of the fourth capacitor C4 is less than or equal to 0.25, a power consumption of gate driving circuit 300 may decrease as the capacitance of each of the second capacitor C2, the third capacitor C3, and the fourth capacitor C4 decreases.

Figure 8:
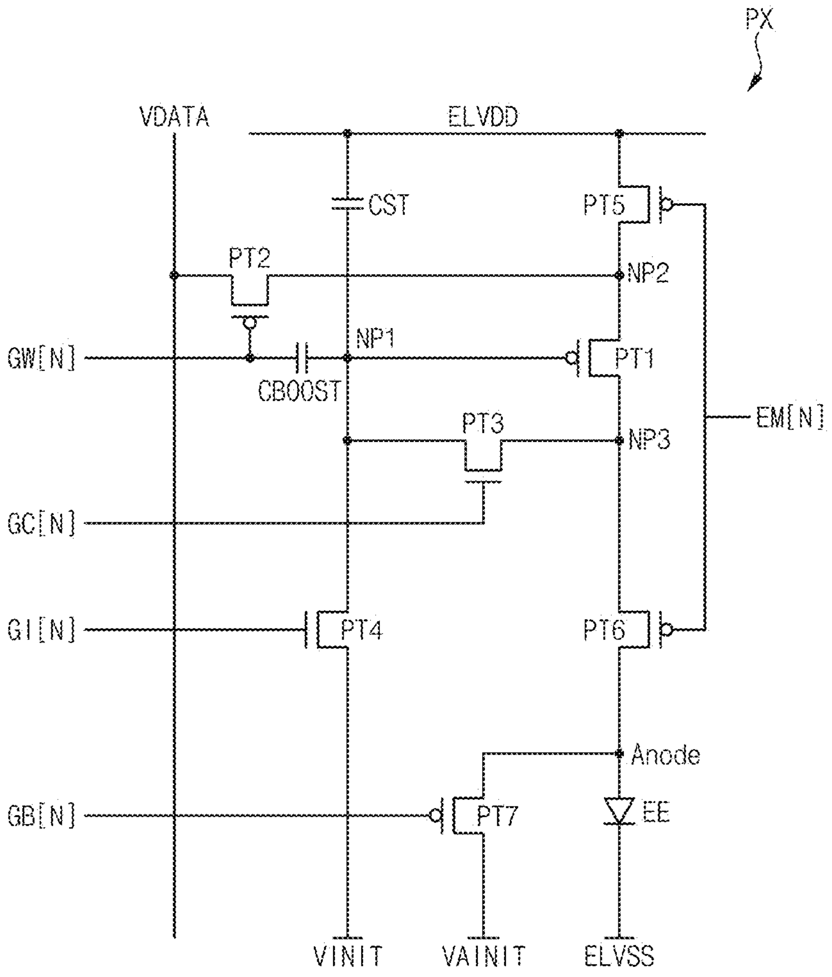
FIG. 8 is a circuit diagram illustrating an embodiment of a pixel of the display device of FIG. 1.

FIG. 8 is a circuit diagram illustrating an embodiment of the pixel PX of the display device 1 of FIG. 1.

Referring to FIGS. 1 to 3 and 8, the display panel 100 may include the pixels PX, and each of the pixels PX may include a light emitting element EE.

In an embodiment, the pixels PX may receive a data writing gate signal GW[N], a compensation gate signal GC[N], a data initialization gate signal GI[N], a light emitting element initialization gate signal GB [N], the data voltage VDATA and the emission signal EM[N], and may display the image according to a level of the data voltage VDATA.

In an embodiment, the pixel PX may include a first type transistor and a second type transistor which is different from the first type transistor. For example, the first type transistor may be the PMOS transistor, and the second type transistor may be the NMOS transistor.

Although the pixel PX is illustrated to include the NMOS transistor and the PMOS transistor in FIG. 8, the present invention is not limited thereto. For another example, the pixel PX may include only the NMOS transistors.

At least one of the pixels PX may include first to seventh pixel transistor PT1 to PT7, a storage capacitor CST, a boost capacitor CBOOST and the light emitting element EE.

The first pixel transistor PT1 may include a control electrode connected to a first pixel node NP1, a first electrode connected to a second pixel node NP2 and a second electrode connected to a third pixel node NP3.

The second pixel transistor PT2 may include a control electrode for receiving the data writing gate signal GW[N], a first electrode for receiving the data voltage VDATA and a second electrode connected to the second pixel node NP2.

The third pixel transistor PT3 may include a control electrode for receiving the compensation gate signal GC[N], a first electrode connected to the first pixel node NP1 and a second electrode connected to the third pixel node NP3.

The gate signal which is output from each of the stages STAGE1, STAGE2, STAGE3, STAGE4, . . . of the gate driving circuit 300 may be the compensation gate signal GC[N].

The third pixel transistor PT3 may be turned on by the compensation gate signal GC[N] having the high level. The third pixel transistor PT3 may diode-connect the first pixel node NP1 and the third pixel node NP3. The pixel PX may operate a threshold voltage compensation operation to compensate a threshold voltage.

The fourth pixel transistor PT4 may include a control electrode for receiving the data initialization gate signal GI[N], a first electrode connected to the first pixel node NP1 and a second electrode for receiving an initialization voltage VINIT.

The fifth pixel transistor PT5 may include a control electrode for receiving the emission signal EM[N], a first electrode for receiving a high power supply voltage ELVDD and a second electrode connected to the second pixel node NP2.

The sixth pixel transistor PT6 may include a control electrode for receiving the emission signal EM[N], a first electrode connected to the third pixel node NP3 and a second electrode connected to an anode electrode Anode of the light emitting element EE.

The seventh pixel transistor PT7 may include a control electrode for receiving the light emitting element initialization gate signal GB [N], a first electrode connected to the anode electrode Anode of the light emitting element EE and a second electrode for receiving an anode initialization voltage VAINIT.

The storage capacitor CST may include a first electrode for receiving the high power supply voltage ELVDD and a second electrode connected to the first pixel node NP1.

The boost capacitor CBOOST may include a first electrode for receiving the data writing gate signal GW[N] and a second electrode connected to the first pixel node NP1.

The light emitting element EE may include the anode electrode Anode connected to the second electrode of the sixth pixel transistor PT6 and a cathode electrode for receiving a low power supply voltage ELVSS.

A driving current of the pixel PX may flow through the fifth pixel transistor PT5, the first pixel transistor PT1 and the sixth pixel transistor PT6 to drive the light emitting element EE. A magnitude of the driving current may be determined by the level of the data voltage VDATA. A luminance of the light emitting element EE may be determined by the magnitude of the driving current.

The fourth capacitor C4 may store the voltage which is the difference between the second voltage DC and the voltage of the second node N2. The voltage of the second node N2 may be maintained at the constant voltage by the second voltage DC applied to the first electrode of the fourth capacitor C4 and the voltage which is stored in the fourth capacitor C4. Accordingly, the voltage of the second node N2 may not be changed by the coupling of the second capacitor C2. When the voltage of the second node N2 is maintained at the constant voltage, the second clock signal CLK2 which is transmitted to the second node N2 may stably maintain the high level. Accordingly, the second stage STAGE2 for outputting the second clock signal CLK2 as the second gate signal GC[2] may stably output the second gate signal GC[2]. Accordingly, the stability and the reliability of the gate driving circuit 300 may be improved.

When the second gate signal GC[2] is stably output, the pixel PX for receiving the second gate signal GC[2] may stably perform the threshold voltage compensation operation. The data voltage VDATA may be sufficiently transmitted to the control electrode of the first pixel transistor PT1. Accordingly, the pixel PX may sufficiently emit a light at a luminance corresponding to the data voltage VDATA. A display quality of the display device 1 may be improved.

Figure 9:
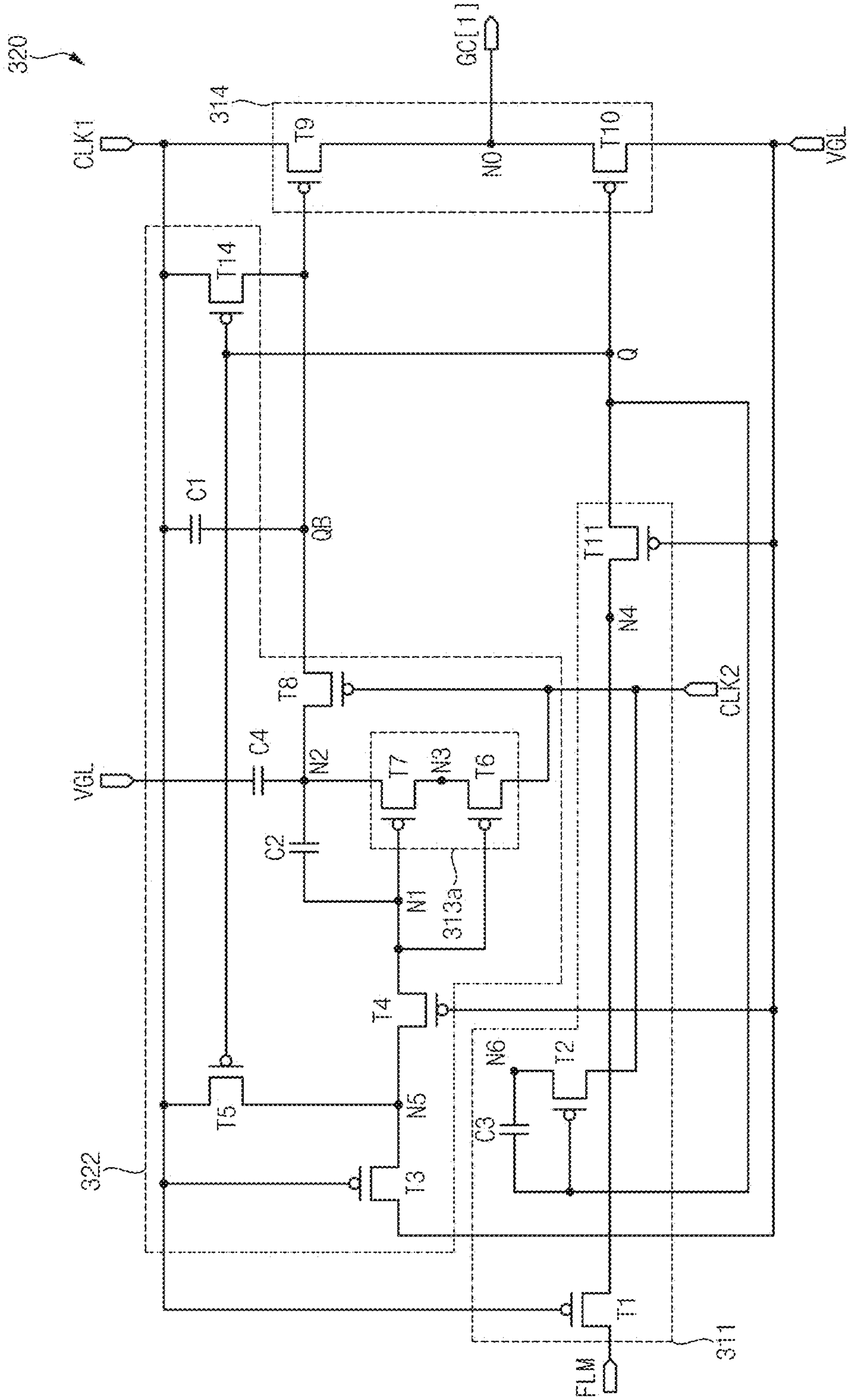
FIG. 9 is a circuit diagram illustrating another embodiment of the stage of the gate driving circuit of FIG. 2.

FIG. 9 is a circuit diagram illustrating an embodiment of a stage 320 of the gate driving circuit 300 of FIG. 2.

Referring to FIGS. 1 to 3 and 9, each of the stages STAGE1, STAGE2, STAGE3, STAGE4, . . . may include the plurality of transistors and the plurality of capacitors. For convenience of explanation, the stage 320 among the stages STAGE1, STAGE2, STAGE3, STAGE4, . . . is assumed to be the first stage STAGE1 for receiving the start signal FLM, the first clock signal CLK1 and the second clock signal CLK2 in FIG. 9.

The first stage 320 is substantially the same as the first stage 310 of FIG. 3 except that a voltage applied to the first electrode of the fourth transistor T4 of the second control circuit 322 is the first voltage VGL. Thus, the same reference numerals will be used to refer to the same or like parts as those described in the previous embodiment of FIG. 3 and any repetitive explanation concerning the above elements will be omitted.

The fourth capacitor C4 may include a first electrode for receiving the first voltage VGL and a second electrode connected to the second node N2.

The fourth capacitor C4 may store the voltage which is the difference between the first voltage VGL and the voltage of the second node N2. The voltage of the second node N2 may be maintained at the constant voltage by the first voltage VGL applied to the first electrode of the fourth capacitor C4 and the voltage which is stored in the fourth capacitor C4. Accordingly, the voltage of the second node N2 may not be changed by the coupling of the second capacitor C2. When the voltage of the second node N2 is maintained at the constant voltage, the second clock signal CLK2 which is transmitted to the second node N2 may stably maintain the high level. Accordingly, the second stage STAGE2 for outputting the second clock signal CLK2 as the second gate signal GC[2] may stably output the second gate signal GC[2]. Accordingly, the stability and the reliability of the gate driving circuit 300 may be improved.

Figure 10:
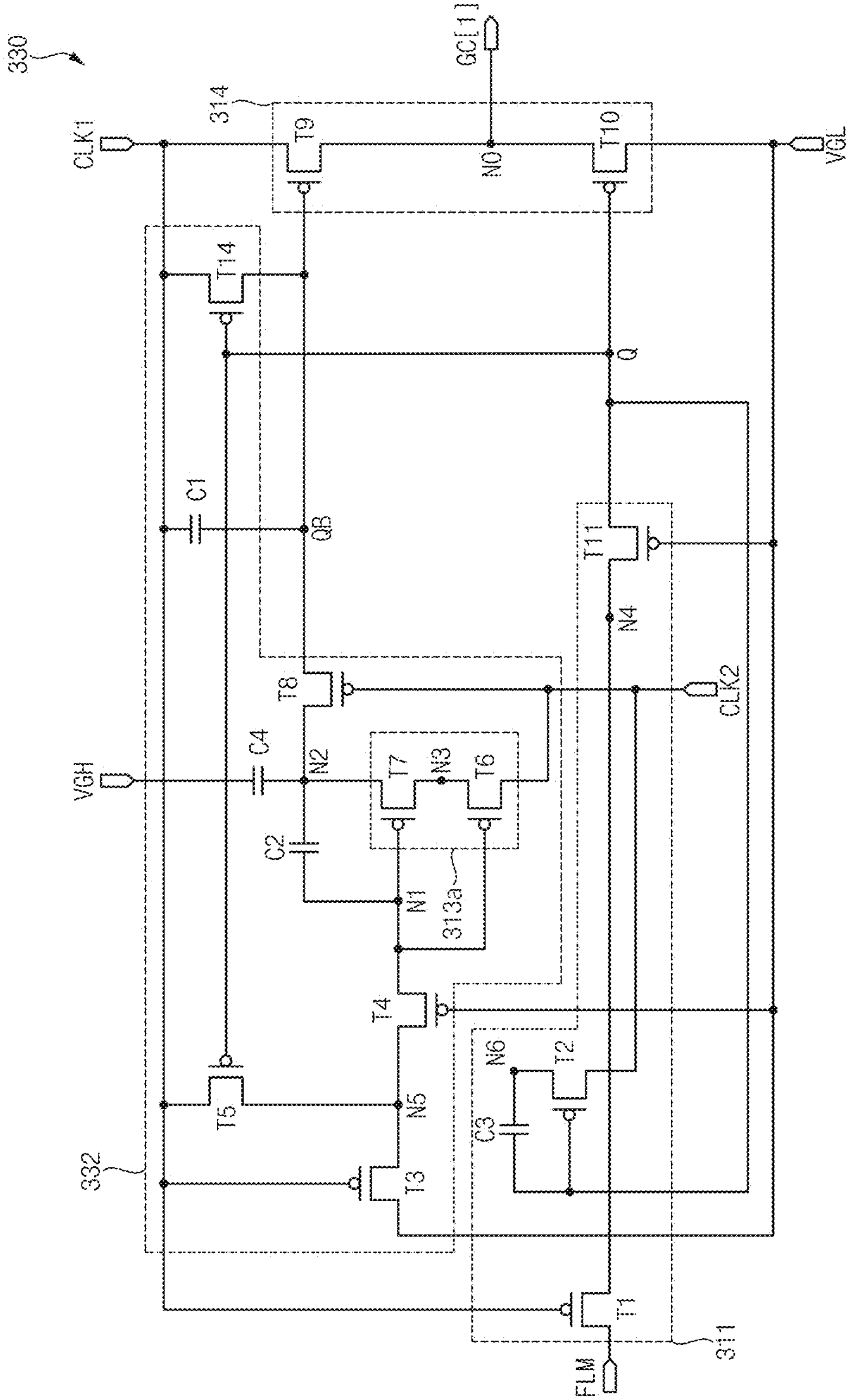
FIG. 10 is a circuit diagram illustrating still another embodiment of the stage of the gate driving circuit of FIG. 2.

FIG. 10 is a circuit diagram illustrating an embodiment of a stage 330 of the gate driving circuit 300 of FIG. 2.

Referring to FIGS. 1 to 3 and 10, each of the stages STAGE1, STAGE2, STAGE3, STAGE4, . . . may include the plurality of transistors and the plurality of capacitors. For convenience of explanation, the stage 330 among the stages STAGE1, STAGE2, STAGE3, STAGE4, . . . is assumed to be the first stage STAGE1 for receiving the start signal FLM, the first clock signal CLK1 and the second clock signal CLK2 in FIG. 10.

The first stage 330 is substantially the same as the first stage 310 of FIG. 3 except that the voltage applied to the first electrode of the fourth transistor T4 of the second control circuit 322 is a third voltage VGH. Thus, the same reference numerals will be used to refer to the same or like parts as those described in the previous embodiment of FIG. 3 and any repetitive explanation concerning the above elements will be omitted.

The fourth capacitor C4 may include a first electrode for receiving the third voltage VGH and a second electrode connected to the second node N2. A level of the third voltage VGH may be higher than a level of the first voltage VGL.

The fourth capacitor C4 may store the voltage which is the difference between the third voltage VGH and the voltage of the second node N2. The voltage of the second node N2 may be maintained at the constant voltage by the third voltage VGH applied to the first electrode of the fourth capacitor C4 and the voltage which is stored in the fourth capacitor C4. Accordingly, the voltage of the second node N2 may not be changed by the coupling of the second capacitor C2. When the voltage of the second node N2 is maintained at the constant voltage, the second clock signal CLK2 which is transmitted to the second node N2 may stably maintain the high level. Accordingly, the second stage STAGE2 for outputting the second clock signal CLK2 as the second gate signal GC[2] may stably output the second gate signal GC[2]. Accordingly, the stability and the reliability of the gate driving circuit 300 may be improved.

Figure 11:
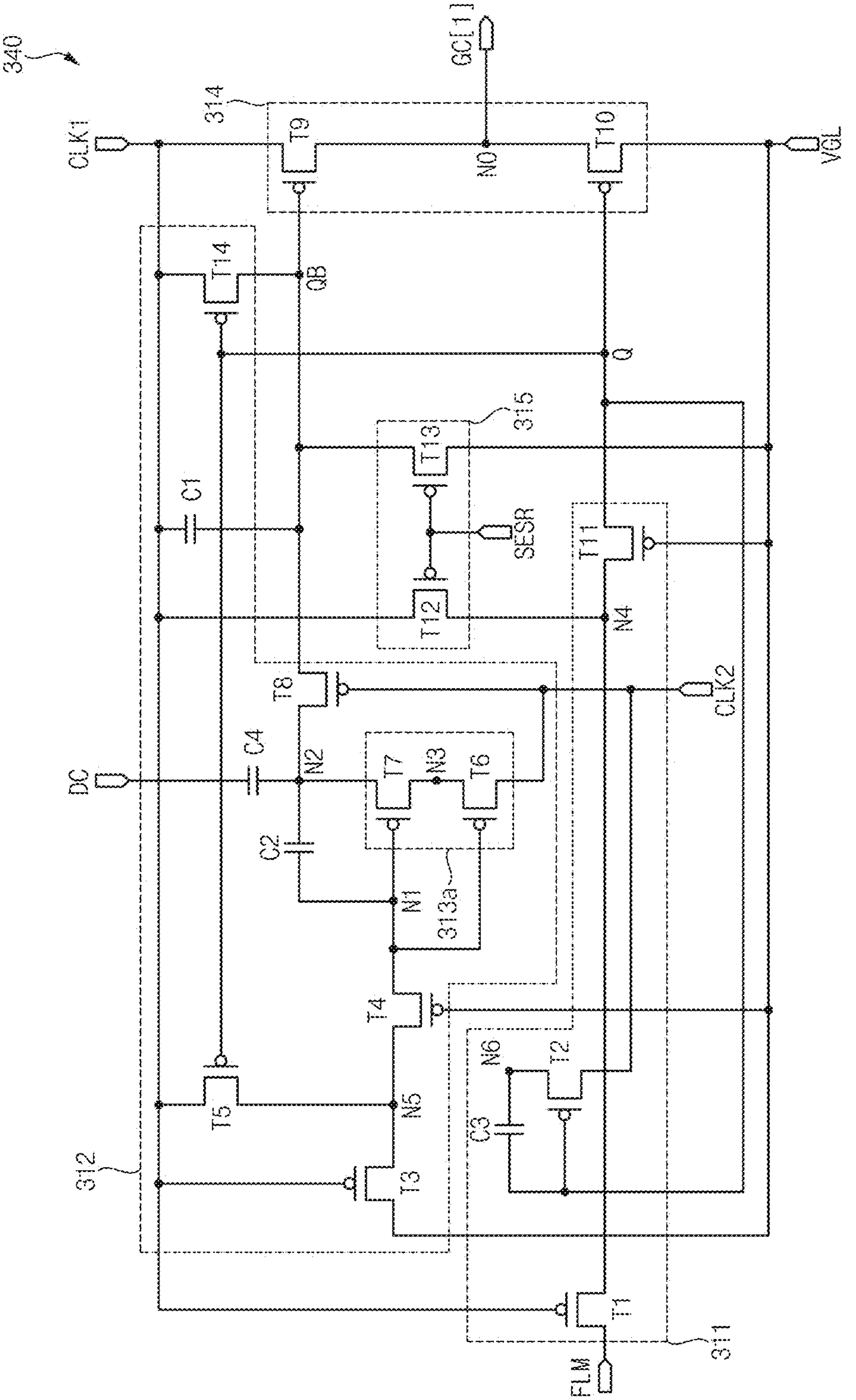
FIG. 11 is a circuit diagram illustrating yet another embodiment of the stage of the gate driving circuit of FIG. 2.

FIG. 11 is a circuit diagram illustrating an embodiment of a stage 340 of the gate driving circuit 300 of FIG. 2.

Referring to FIGS. 1 to 3 and 11, each of the stages STAGE1, STAGE2, STAGE3, STAGE4, . . . may include the plurality of transistors and the plurality of capacitors. For convenience of explanation, the stage 340 among the stages STAGE1, STAGE2, STAGE3, STAGE4, . . . is assumed to be the first stage STAGE1 for receiving the start signal FLM, the first clock signal CLK1 and the second clock signal CLK2 in FIG. 11.

The first stage 340 is substantially the same as the first stage 310 of FIG. 3 except that the first stage 340 further includes a reset circuit 315. Thus, the same reference numerals will be used to refer to the same or like parts as those described in the previous embodiment of FIG. 3 and any repetitive explanation concerning the above elements will be omitted.

The first stage 340 may further include the reset circuit 315 for initializing the voltage of the first control node Q and the voltage of the second control node QB.

The reset circuit 315 may include a twelfth transistor T12 and a thirteenth transistor T13.

The twelfth transistor T12 may include a control electrode for receiving a reset signal SESR, a first electrode for receiving the first clock signal CLK1 and a second electrode connected to the fourth node N4.

The thirteenth transistor T13 may include a control electrode for receiving the reset signal SESR, a first electrode connected to the second control node QB and a second electrode for receiving the first voltage VGL.

When a level of the reset signal SESR is the low level, the twelfth transistor T12 and the thirteenth transistor T13 may be turned on. The voltage of the first control node Q may be initialized by the twelfth transistor T12 to a voltage having the high level. The voltage of the second control node QB may be initialized by the thirteenth transistor T13 to a voltage having the low level. The ninth transistor T9 may be turned on by the voltage of the second control node QB. The ninth transistor T9 may transmit the first clock signal CLK1 having the high level to the output node NO. Accordingly, the first stage 340 may output the first gate signal GC[1] having the high level.

When the gate driving circuit 300 is operated for the first time, the gate driving circuit 300 may be stably operated by an initialization operation of the reset circuit 315. Accordingly, the stability and the reliability of the gate driving circuit 300 may be improved.

In addition, the fourth capacitor C4 may store the voltage which is the difference between the second voltage DC and the voltage of the second node N2. The voltage of the second node N2 may be maintained at the constant voltage by the second voltage DC applied to the first electrode of the fourth capacitor C4 and the voltage which is stored in the fourth capacitor C4. Accordingly, the voltage of the second node N2 may not be changed by the coupling of the second capacitor C2. When the voltage of the second node N2 is maintained at the constant voltage, the second clock signal CLK2 which is transmitted to the second node N2 may stably maintain the high level. Accordingly, the second stage STAGE2 for outputting the second clock signal CLK2 as the second gate signal GC[2] may stably output the second gate signal GC[2]. Accordingly, the stability and the reliability of the gate driving circuit 300 may be improved.

Figure 12:
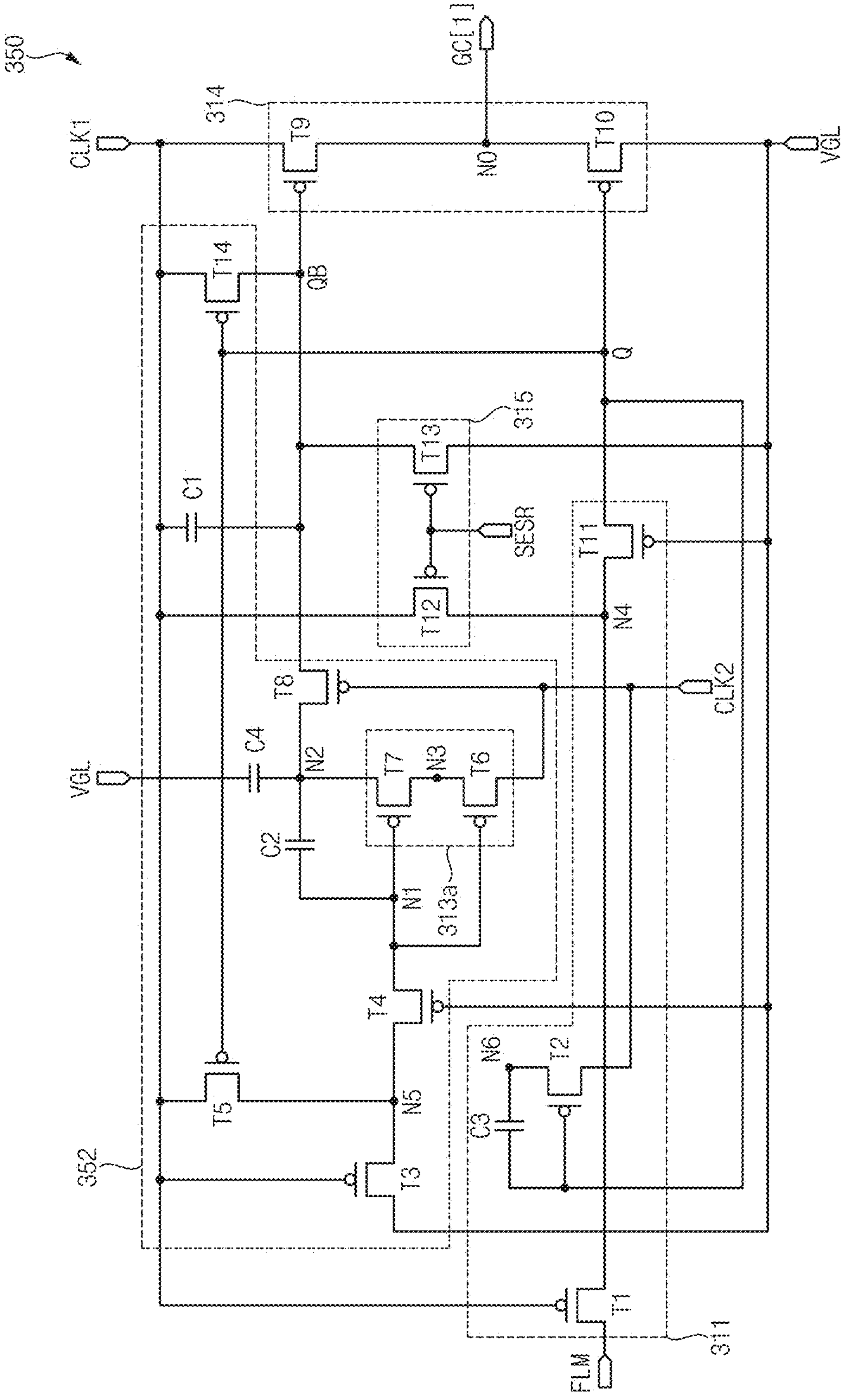
FIG. 12 is a circuit diagram illustrating another embodiment of the stage of the gate driving circuit of FIG. 2.

FIG. 12 is a circuit diagram illustrating an embodiment of a stage 350 of the gate driving circuit 300 of FIG. 2.

Referring to FIGS. 1 to 3 and 12, each of the stages STAGE1, STAGE2, STAGE3, STAGE4, . . . may include the plurality of transistors and the plurality of capacitors. For convenience of explanation, the stage 350 among the stages STAGE1, STAGE2, STAGE3, STAGE4, . . . is assumed to be the first stage STAGE1 for receiving the start signal FLM, the first clock signal CLK1 and the second clock signal CLK2 in FIG. 12.

The first stage 350 is substantially the same as the first stage 340 of FIG. 11 except that the voltage applied to the first electrode of the fourth transistor T4 of the second control circuit 322 is the first voltage VGL. Thus, the same reference numerals will be used to refer to the same or like parts as those described in the previous embodiment of FIG. 11 and any repetitive explanation concerning the above elements will be omitted.

The fourth capacitor C4 may include a first electrode for receiving the first voltage VGL and a second electrode connected to the second node N2.

The fourth capacitor C4 may store the voltage which is the difference between the first voltage VGL and the voltage of the second node N2. The voltage of the second node N2 may be maintained at the constant voltage by the first voltage VGL applied to the first electrode of the fourth capacitor C4 and the voltage which is stored in the fourth capacitor C4. Accordingly, the voltage of the second node N2 may not be changed by the coupling of the second capacitor C2. When the voltage of the second node N2 is maintained at the constant voltage, the second clock signal CLK2 which is transmitted to the second node N2 may stably maintain the high level. Accordingly, the second stage STAGE2 for outputting the second clock signal CLK2 as the second gate signal GC[2] may stably output the second gate signal GC[2]. Accordingly, the stability and the reliability of the gate driving circuit 300 may be improved.

Figure 13:
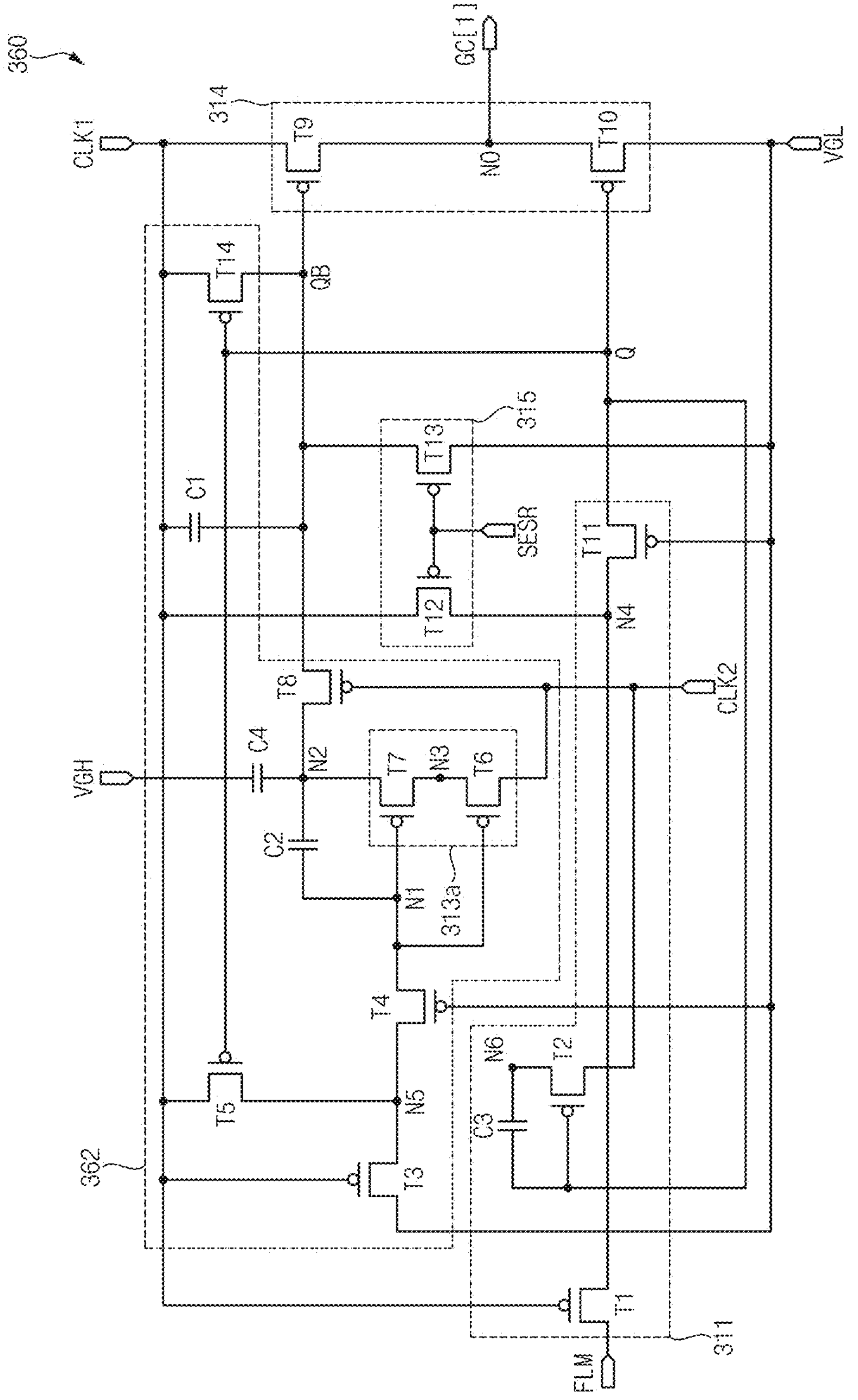
FIG. 13 is a circuit diagram illustrating still another embodiment of the stage of the gate driving circuit of FIG. 2.

FIG. 13 is a circuit diagram illustrating an embodiment of a stage 360 of the gate driving circuit 300 of FIG. 2.

Referring to FIGS. 1 to 3, 10 and 13, each of the stages STAGE1, STAGE2, STAGE3, STAGE4, . . . may include the plurality of transistors and the plurality of capacitors. For convenience of explanation, the stage 360 among the stages STAGE1, STAGE2, STAGE3, STAGE4, . . . is assumed to be the first stage STAGE1 for receiving the start signal FLM, the first clock signal CLK1 and the second clock signal CLK2 in FIG. 13.

The first stage 360 is substantially the same as the first stage 340 of FIG. 11 except that the voltage applied to the first electrode of the fourth transistor T4 of the second control circuit 322 is the third voltage VGH. Thus, the same reference numerals will be used to refer to the same or like parts as those described in the previous embodiment of FIG. 11 and any repetitive explanation concerning the above elements will be omitted.

The fourth capacitor C4 may include a first electrode for receiving the third voltage VGH and a second electrode connected to the second node N2. The level of the third voltage VGH may be higher than the level of the first voltage VGL.

The fourth capacitor C4 may store the voltage which is the difference between the third voltage VGH and the voltage of the second node N2. The voltage of the second node N2 may be maintained at the constant voltage by the third voltage VGH applied to the first electrode of the fourth capacitor C4 and the voltage which is stored in the fourth capacitor C4. Accordingly, the voltage of the second node N2 may not be changed by the coupling of the second capacitor C2. When the voltage of the second node N2 is maintained at the constant voltage, the second clock signal CLK2 which is transmitted to the second node N2 may stably maintain the high level. Accordingly, the second stage STAGE2 for outputting the second clock signal CLK2 as the second gate signal GC[2] may stably output the second gate signal GC[2]. Accordingly, the stability and the reliability of the gate driving circuit 300 may be improved.

Figure 14:
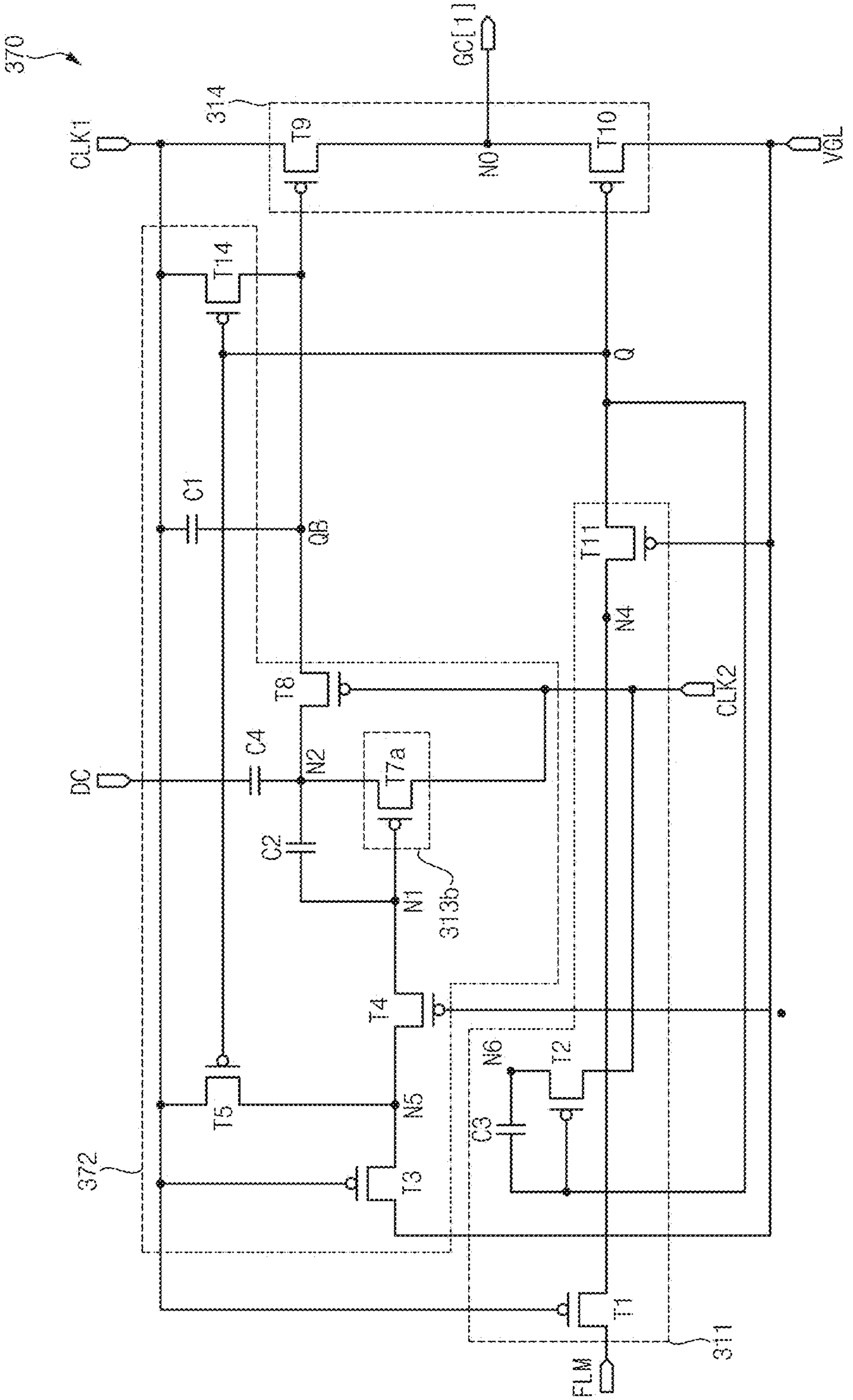
FIG. 14 is a circuit diagram illustrating yet another embodiment of the stage of the gate driving circuit of FIG. 2.

FIG. 14 is a circuit diagram illustrating an embodiment of a stage 370 of the gate driving circuit 300 of FIG. 2.

Referring to FIGS. 1 to 3 and 14, each of the stages STAGE1, STAGE2, STAGE3, STAGE4, . . . may include the plurality of transistors and the plurality of capacitors. For convenience of explanation, the stage 370 among the stages STAGE1, STAGE2, STAGE3, STAGE4, . . . is assumed to be the first stage STAGE1 for receiving the start signal FLM, the first clock signal CLK1 and the second clock signal CLK2 in FIG. 14.

The first stage 370 is substantially the same as the first stage 310 of FIG. 3 except for a switching circuit 313*b* of a second control circuit 372. Thus, the same reference numerals will be used to refer to the same or like parts as those described in the previous embodiment of FIG. 3 and any repetitive explanation concerning the above elements will be omitted.

The switching circuit 313*b* may include a seventh transistor T7*a*.

The seventh transistor Ta may include a control electrode connected to the first node N1, a first electrode connected to the second node N2 and a second electrode for receiving the second clock signal CLK2.

The second voltage DC may be the constant voltage. For example, the second voltage DC may be substantially the same as the first voltage VGL. For example, a level of the second voltage DC may be lower than the level of the first voltage VGL. For example, a level of the second voltage DC may be higher than the level of the first voltage VGL, and the second voltage DC may be the third voltage VGH.

The fourth capacitor C4 may store the voltage which is the difference between the second voltage DC and the voltage of the second node N2. The voltage of the second node N2 may be maintained at the constant voltage by the second voltage DC applied to the first electrode of the fourth capacitor C4 and the voltage which is stored in the fourth capacitor C4. Accordingly, the voltage of the second node N2 may not be changed by the coupling of the second capacitor C2. When the voltage of the second node N2 is maintained at the constant voltage, the second clock signal CLK2 which is transmitted to the second node N2 may stably maintain the high level. Accordingly, the second stage STAGE2 for outputting the second clock signal CLK2 as the second gate signal GC[2] may stably output the second gate signal GC[2]. Accordingly, the stability and the reliability of the gate driving circuit 300 may be improved.

Figure 15:
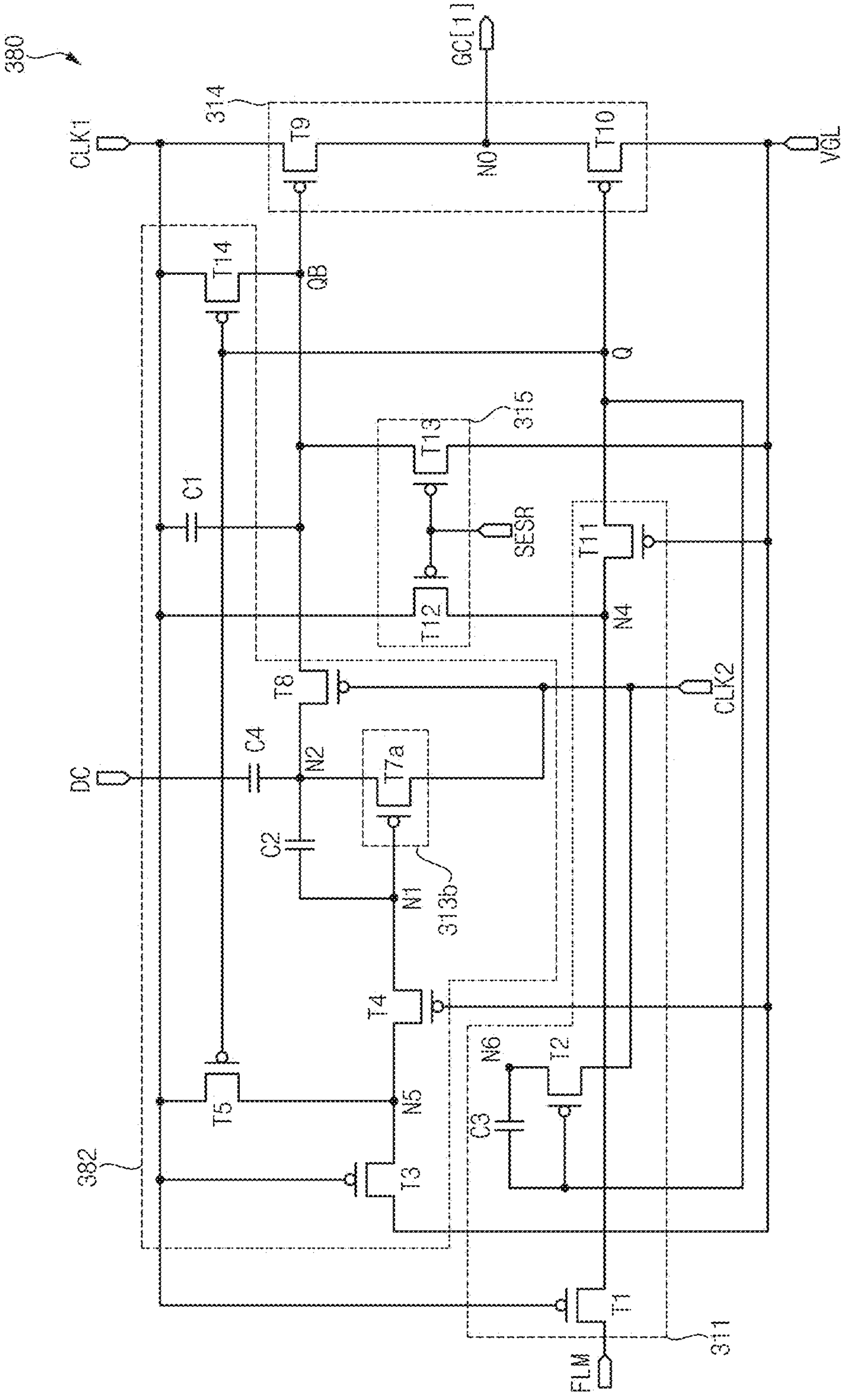
FIG. 15 is a circuit diagram illustrating another embodiment of the stage of the gate driving circuit of FIG. 2.

FIG. 15 is a circuit diagram illustrating an embodiment of a stage 380 of the gate driving circuit 300 of FIG. 2.

Referring to FIGS. 1 to 3, 14 and 15, each of the stages STAGE1, STAGE2, STAGE3, STAGE4, . . . may include the plurality of transistors and the plurality of capacitors. For convenience of explanation, the stage 380 among the stages STAGE1, STAGE2, STAGE3, STAGE4, . . . is assumed to be the first stage STAGE1 for receiving the start signal FLM, the first clock signal CLK1 and the second clock signal CLK2 in FIG. 15.

The first stage 380 is substantially the same as the first stage 370 of FIG. 14 except that the first stage 380 further includes a reset circuit 315. Thus, the same reference numerals will be used to refer to the same or like parts as those described in the previous embodiment of FIG. 14 and any repetitive explanation concerning the above elements will be omitted.

The first stage 380 may further include the reset circuit 315 for initializing the voltage of the first control node Q and the voltage of the second control node QB.

The reset circuit 315 may include a twelfth transistor T12 and a thirteenth transistor T13.

The twelfth transistor T12 may include a control electrode for receiving a reset signal SESR, a first electrode for receiving the first clock signal CLK1 and a second electrode connected to the fourth node N4.

The thirteenth transistor T13 may include a control electrode for receiving the reset signal SESR, a first electrode connected to the second control node QB and a second electrode for receiving the first voltage VGL.

When a level of the reset signal SESR is the low level, the twelfth transistor T12 and the thirteenth transistor T13 may be turned on. The voltage of the first control node Q may be initialized by the twelfth transistor T12 to a voltage having the high level. The voltage of the second control node QB may be initialized by the thirteenth transistor T13 to a voltage having the low level. The ninth transistor T9 may be turned on by the voltage of the second control node QB. The ninth transistor T9 may transmit the first clock signal CLK1 having the high level to the output node NO. Accordingly, the first stage 380 may output the first gate signal GC[1] having the high level.

When the gate driving circuit 300 is operated for the first time, the gate driving circuit 300 may be stably operated by an initialization operation of the reset circuit 315. Accordingly, the stability and the reliability of the gate driving circuit 300 may be improved.

In addition, the fourth capacitor C4 may store the voltage which is the difference between the second voltage DC and the voltage of the second node N2. The voltage of the second node N2 may be maintained at the constant voltage by the second voltage DC applied to the first electrode of the fourth capacitor C4 and the voltage which is stored in the fourth capacitor C4. Accordingly, the voltage of the second node N2 may not be changed by the coupling of the second capacitor C2. When the voltage of the second node N2 is maintained at the constant voltage, the second clock signal CLK2 which is transmitted to the second node N2 may stably maintain the high level. Accordingly, the second stage STAGE2 for outputting the second clock signal CLK2 as the second gate signal GC[2] may stably output the second gate signal GC[2]. Accordingly, the stability and the reliability of the gate driving circuit 300 may be improved.

Figure 16:
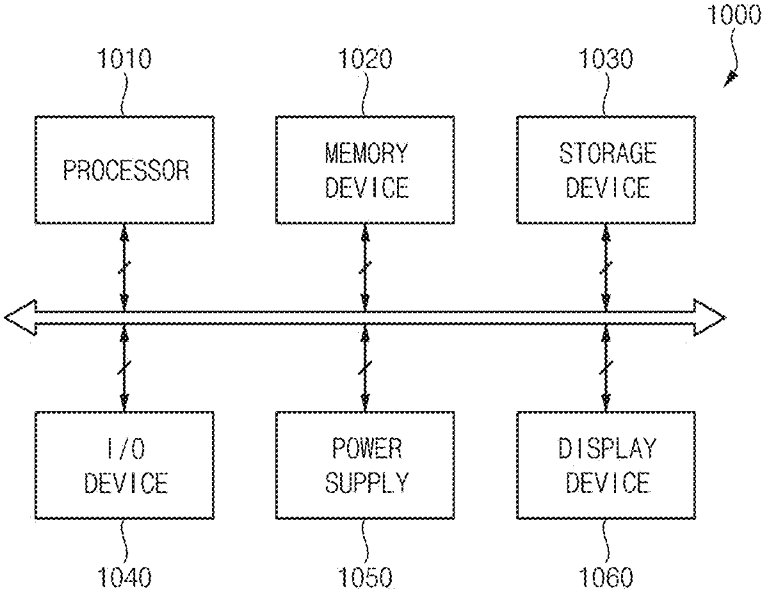
FIG. 16 is a block diagram illustrating an electronic device according to embodiments of the present invention.
Figure 17:
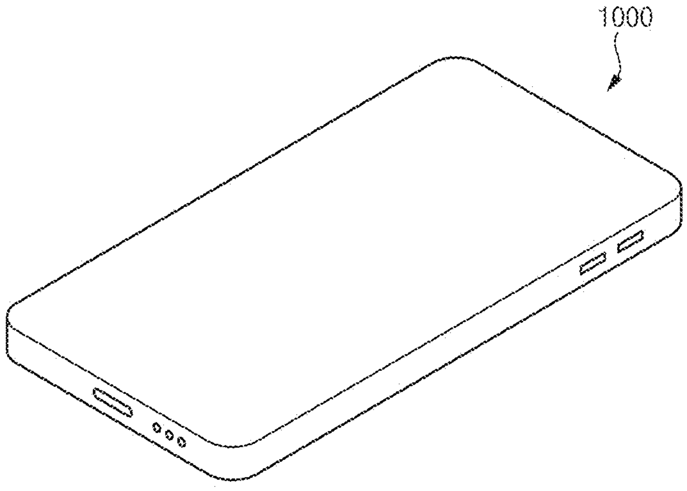
FIG. 17 is a diagram illustrating an embodiment in which the electronic device of FIG. 16 is implemented as a smart phone.

FIG. 16 is a block diagram illustrating an electronic device 1000 according to embodiments of the present invention. FIG. 17 is a diagram illustrating an embodiment in which the electronic device 1000 of FIG. 16 is implemented as a smart phone.

Referring to FIGS. 16 and 17, the electronic device 1000 may include a processor 1010, a memory device 1020, a storage device 1030, an input/output (I/O) device 1040, a power supply 1050 and a display device 1060. The display device 1060 may be the display device 1 of FIG. 1. In addition, the electronic device 1000 may further include ports for communicating with a video card, a sound card, a memory card, a universal serial bus (USB) device, other electronic device, and the like.

In an embodiment, as illustrated in FIG. 17, the electronic device 1000 may be implemented as the smart phone. However, the electronic device 1000 is not limited thereto. For another example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a microprocessor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. According to an embodiment, the I/O device 1040 may include the display device 1060.

The power supply 1050 may provide power for operations of the electronic device 1000.

The display device 1060 may be connected to other components through buses or other communication links.

Figure 18:
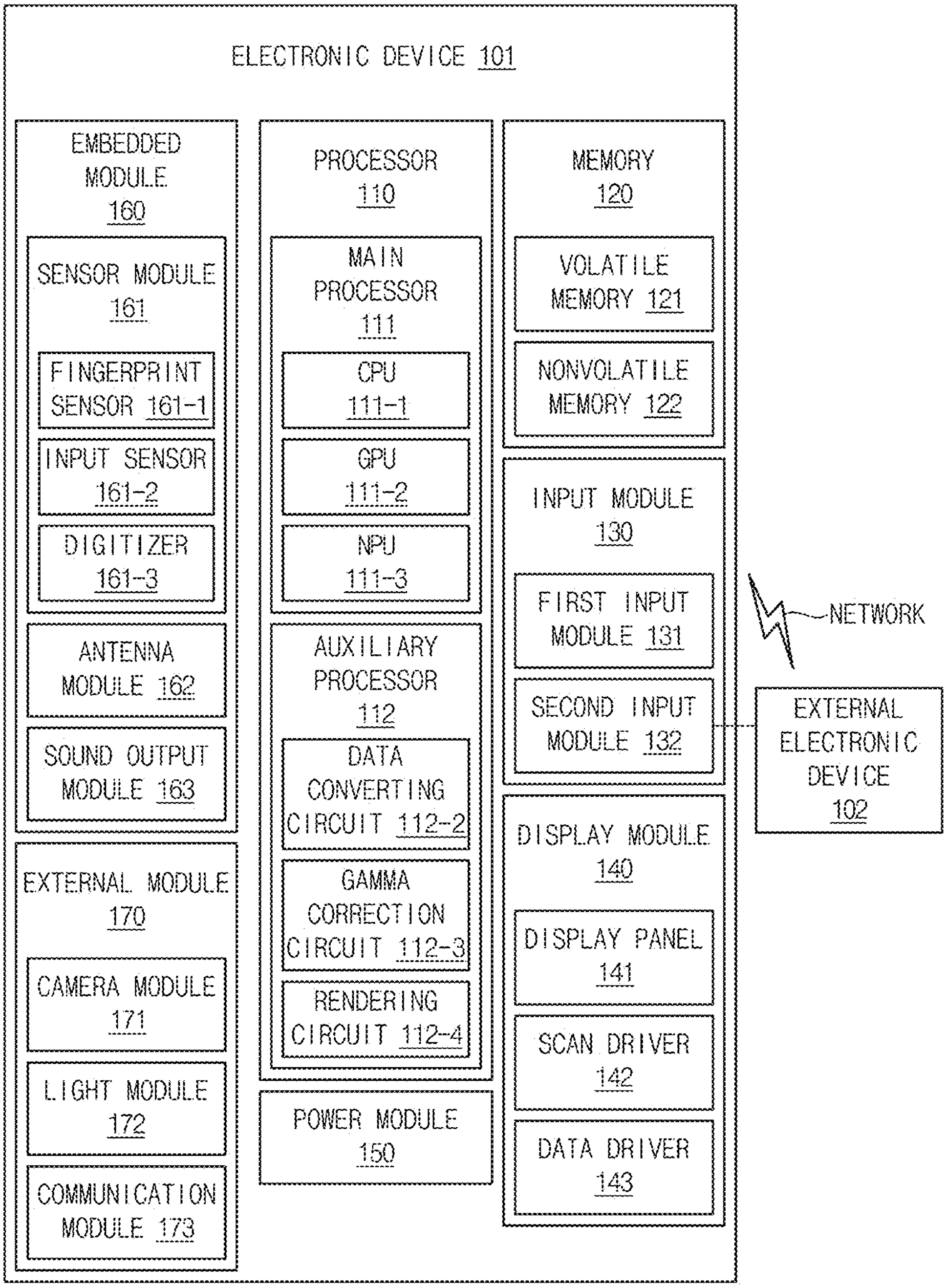
FIG. 18 is a block diagram illustrating the electronic device according to embodiments of the present invention.

FIG. 18 is a block diagram illustrating an electronic device 101 according to embodiments of the present invention.

Referring to FIGS. 1 to 18, the electronic device 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. For example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains input fingerprint information as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input in the music streaming application, the processor 110 activates a sound output module 163 to provide sound information corresponding to the music execution command to the user.

In the above, the operation of the electronic device 101 is briefly described. Hereinafter, a configuration of the electronic device 101 is described in detail. Some of elements of the electronic device 101 described later may be integrated and provided as one element, or one element may be separated as two or more elements.

The electronic device 101 may communicate with an external electronic device 102 through a network (e.g. a short-range wireless communication network or a long-range wireless communication network). According to an embodiment, the electronic device 101 may include the processor 110, the memory 120, the input module 130, the display module 140, a power module 150, an embedded module 160, and an external module 170. According to an embodiment, in the electronic device 101, at least one of the above-described elements may be omitted or one or more other device may be added. According to an embodiment, some of the above-described elements (e.g., the sensor module 161, an antenna module 162 or the sound output module 163) may be integrated into another element (e.g. the display module 140).

The processor 110 may execute software to control at least one other element (e.g. hardware or software element) of the electronic device 101 connected to the processor 110 and to perform various data processing or operations. According to an embodiment, as at least part of the data processing or the operations, the processor 110 may store receive instructions or data from other elements (e.g. the input module 130, the sensor module 161 or a communication module 173) in a volatile memory 121, may process the instructions or data stored in the volatile memory 121 and may store result data of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include any one or more of a graphic processing unit (GPU) 111-2, a communication processor (CP) and an image signal processor (ISP). The main processor 111 may further include a neural processing unit (NPU) 111-3. The neural network processing unit 111-3 is a processor specialized in processing an artificial intelligence model. The artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN) and a deep Q-networks or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g. a single chip) or each may be implemented as independent elements (e.g. in a plurality of chips).

The main processor 111 may output an image signal to the auxiliary processor 112. For example, the main processor 111 may output an input image data and an input control signal to the auxiliary processor 112.

The auxiliary processor 112 may include a controller. The controller may include an interface conversion circuit and a timing control circuit. The controller receives the image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance according to characteristics of the electronic device 101 or a user setting or may convert the image data to reduce a power consumption or compensate for afterimages. The gamma correction circuit 112-3 may convert the image data or a gamma reference voltage such that the image displayed on the electronic device 101 has desired gamma characteristics. The rendering circuit 112-4 may receive the image data from the controller and may render the image data based on a pixel arrangement of the display panel 141 included in the electronic device 101. At least one of the data converting circuit 112-2, the gamma correction circuit 112-3 and the rendering circuit 112-4 may be integrated into another element (e.g. the main processor 111 or the controller). At least one of the data converting circuit 112-2, the gamma correction circuit 112-3 and the rendering circuit 112-4 may be integrated into a data driver 143 to be described later.

The memory 120 may store various data used by at least one element (e.g. the processor 110 or the sensor module 161) of the electronic device 101 and input data or output data for commands related thereto. The memory 120 may include at least one of the volatile memory 121 and the nonvolatile memory 122.

The input module 130 may receive commands or data used to the elements (e.g. the processor 110, the sensor module 161 or the sound output module 163) of the electronic device 101 from the outside of the electronic device 101 (e.g. the user or the external electronic device 102).

The input module 130 may include a first input module 131 for receiving commands or data from the user and a second input module 132 for receiving commands or data from the external electronic device 102. The first input module 131 may include a microphone, a mouse, a keyboard, a key (e.g. a button) or a pen (e.g. a passive pen or an active pen). The second input module 132 may support a designated protocol capable of connecting to the external electronic device 102 by wire or wirelessly. According to an embodiment, the second input module 132 may include a high definition multimedia interface (HDMI), a universal serial bus (USB) interface, an SD card interface or an audio interface. The second input module 132 may include a connector physically connected to the external electronic device 102, for example, an HDMI connector, a USB connector, an SD card connector, or an audio connector (e.g. a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. A type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. Alternatively, the scan driver 142 may be integrated on the display panel 141. For example, the scan driver 142 may include an amorphous silicon TFT gate driver circuit (ASG) integrated on the display panel 141, a low temperature polycrystalline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. The light emission driver may be formed independently from the scan driver 142. Alternatively, the light emission driver and the scan driver 142 may be integrally formed.

The data driver 143 receives a control signal from the controller and converts the image data into an analog voltage (e.g. the data voltage) and output the data voltages to the display panel 141 in response to the control signal.

The data driver 143 may be integrated into another element (e.g. the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic device 101. The power module 150 may include a battery which supplies a power voltage. The battery may include a non-rechargeable primary cell, a rechargeable secondary cell or a fuel cell. The power module 150 may include a power management integrated circuit (PMIC). The PMIC supplies optimized power to each of the above-described modules and modules described later. The power module 150 may include a wireless power transmission/reception member electrically connected to the battery. The wireless power transmission/reception member may include a plurality of antenna radiators in a form of coils.

The electronic device 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corresponding to the input. The sensor module 161 may include at least one of the fingerprint sensor 161-1, the input sensor 161-2 and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure biosignals such as blood pressure, moisture, or body fat. For example, when a user touches a part of his body to a sensor layer or a sensing panel and does not move for a certain period of time, the input sensor 161-2 may detect the biosignal based on a change in an electric field caused by the part of the body so that the display module 140 may output user's desired information.

The digitizer 161-3 may generate a data value corresponding to the coordinate information input by the pen. The digitizer 161-3 generates an amount of electromagnetic change by the input as a data value. The digitizer 161-3 may detect an input by the passive pen or transmit/receive data to/from the active pen.

At least one of the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one of the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The present invention may not be limited to a position of the sensing panel.

At least one of the fingerprint sensor 161-1, the input sensor 161-2 and the digitizer 161-3 may be embedded in the display panel 141. For example, at least one of the fingerprint sensor 161-1, the input sensor 161-2 and the digitizer 161-3 is formed simultaneously with the display panel 141 through a process of forming elements included in the display panel 141 (e.g. light emitting elements, transistors, etc.).

In addition, the sensor module 161 may generate an electrical signal or a data value corresponding to an internal state or an external state of the electronic device 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor or an illuminance sensor.

The antenna module 162 may include one or more antennas for transmitting a signal or power to outside or receiving a signal or power from outside. According to an embodiment, the communication module 173 may transmit a signal to an external electronic device or receive a signal from an external electronic device through an antenna suitable for a communication method. An antenna pattern of the antenna module 162 may be integrated with an element of the display module 140 (e.g. the display panel 141) or the input sensor 161-2.

The sound output module 163 is a device for outputting sound signals to the outside of the electronic device 101. For example, the sound output module 163 may include a speaker used for general purposes such as playing multimedia or recording and a receiver used exclusively for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze.

The light module 172 may provide light. The light module 172 may include a light emitting diode or a xenon lamp. The light module 172 may operate in conjunction with the camera module 171 or operate independently.

The communication module 173 may support establishment of a wired or wireless communication channel between the electronic device 101 and the external electronic device 102 and communication through the established communication channel. The communication module 173 may include one or both of a wireless communication module such as a cellular communication module, a short-distance wireless communication module, or a global navigation satellite system (GNSS) communication module and a wired communication module such as a local area network (LAN) communication module, or a power line communication module. The communication module 173 may communicate with the external electronic device 102 through a short-range communication network such as Bluetooth, WiFi direct or infrared data association (IrDA) or a long-distance communication network such as a cellular network, the Internet, or a computer network (e.g. LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. For example, the processor 110 may generate image data corresponding to input data applied through a mouse or an active pen, and output the generated image data to the display module 140 or the processor 110 may generate command data corresponding to the input data and output the generated command data to the camera module 171 or the light module 172. When input data is not received from the input module 130 for a certain period of time, the processor 110 converts an operation mode of the electronic device 101 into a low power mode or a sleep mode so that the power consumption of the electronic device 101 may be reduced.

The processor 110 outputs commands or data to the display module 140, the sound output module 163, the camera module 171 or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the sensed data sensed by the input sensor 161-2 or the digitizer 161-3. When the sensor module 161 includes a temperature sensor, the processor 110 may receive temperature data for the temperature measured from the sensor module 161 and may further perform luminance correction on the image data based on the temperature data.

The processor 110 may receive determined data about the presence or the absence of the user, the user's location and the user's gaze from the camera module 171. The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output (GPIO), a serial peripheral interface (SPI), a mobile industry processor interface (MIPI), or a ultra path interconnect (UPI) link to exchange signals (e.g. commands or data) with each other. The processor 110 may communicate with the display module 140 through an agreed interface. For example, the processor 110 may communicate with the display module 140 through any one of the above communication methods. The present invention may not be limited to the above communication methods.

The electronic device 101 according to various embodiments disclosed in the disclosure may be various types of devices. For example, the electronic device 101 may include at least one of a portable communication device (e.g. a smart phone), a computer device, a portable multimedia device, a portable medical device, a camera, a wearable device and a home appliance. The electronic device 101 according to the embodiment of the disclosure may not be limited to the aforementioned devices.

For example, the display panel 100 of FIG. 1 may correspond to the display panel 141 of FIG. 18. For example, the driving controller 200 of FIG. 1 may correspond to the controller of the auxiliary processor 112 of FIG. 18. For example, the gate driving circuit 300 of FIG. 1 may correspond to the scan driver 142 of FIG. 18. For example, the data driving circuit 500 of FIG. 1 may correspond to the data driver 143 of FIG. 18.

In addition, the main processor 111 may be the application processor (AP). When the electronic device 101 is powered on, the application processor (AP) may output a power-on signal to the driving controller 200. When the driving controller 200 receives the power-on signal, the driving controller 200 may output the reset signal SESR having the low level to the gate driving circuit 300. The twelfth transistor T12 and the thirteenth transistor T13 included in the gate driving circuit 300 may be turned on in response to the reset signal SESR having the low level. The voltage of the first control node Q may be initialized by the twelfth transistor T12 to the voltage having the high level. The voltage of the second control node QB may be initialized by the thirteenth transistor T13 to the voltage having the low level.

In addition, the application processor (AP) may transmit the input image data IMG and the input control signal CONT to the driving controller 200. The driving controller 200 may output the first control signal CONT1 to the gate driving circuit 300 in response to the input control signal CONT. The first control signal CONT1 may include the start signal FLM, the first clock signal CLK1 and the second clock signal CLK2.

The present inventions may be applied to any display device and any electronic device including the display device. For example, the present inventions may be applied to a television (TV), a digital TV, a 3D TV, a mobile phone, a smart phone, a tablet computer, a laptop computer, a personal computer (PC), a household electronic device, a personal digital assistant (PDA), a portable multimedia player (PMP), a digital camera, a music player, a portable game console, a navigation device, etc.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A gate driving circuit comprising:

a first control circuit configured to control a voltage of a first control node based on an input signal, a first clock signal and a second clock signal;

a second control circuit configured to control a voltage of a second control node based on the first clock signal and the second clock signal; and an output circuit configured to output the first clock signal or a first voltage as a gate signal based on the voltage of the first control node and the voltage of the second control node, wherein the second control circuit includes:

a switching circuit connected to a first node and a second node, and configured to receive the second clock signal;

a second capacitor including a first electrode connected to the first node and a second electrode connected to the second node; and a fourth capacitor including a first electrode configured to receive a second voltage and a second electrode connected to the second node.

2. The gate driving circuit of claim 1, wherein the switching circuit includes:

a sixth transistor including a control electrode connected to the first node, a first electrode connected to a third node and a second electrode configured to receive the second clock signal; and a seventh transistor including a control electrode connected to the first node, a first electrode connected to the second node and a second electrode connected to the third node.

3. The gate driving circuit of claim 1, wherein the switching circuit includes a seventh transistor including a control electrode connected to the first node, a first electrode connected to the second node and a second electrode configured to receive the second clock signal.

4. The gate driving circuit of claim 1, wherein the second voltage is substantially the same as the first voltage.

5. The gate driving circuit of claim 1, wherein the second control circuit further includes:

a third transistor including a control electrode configured to receive the first clock signal, a first electrode configured to receive the first voltage and a second electrode connected to a fifth node;

a fourth transistor including a control electrode configured to receive the first voltage, a first electrode connected to the fifth node and a second electrode connected to the first node;

a fifth transistor including a control electrode connected to the first control node, a first electrode configured to receive the first clock signal and a second electrode connected to the fifth node;

an eighth transistor including a control electrode configured to receive the second clock signal, a first electrode connected to the second node and a second electrode connected to the second control node; and a first capacitor including a first electrode configured to receive the first clock signal and a second electrode connected to the second control node.

6. The gate driving circuit of claim 1, wherein the first control circuit includes:

a first transistor including a control electrode configured to receive the first clock signal, a first electrode configured to receive the input signal and a second electrode connected to a fourth node;

a second transistor including a control electrode connected to the first control node, a first electrode connected to a sixth node and a second electrode configured to receive the second clock signal;

an eleventh transistor including a control electrode configured to receive the first voltage, a first electrode connected to the fourth node and a second electrode connected to the first control node; and a third capacitor including a first electrode connected to the first control node and a second electrode connected to the sixth node.

7. The gate driving circuit of claim 1, wherein the output circuit includes:

a ninth transistor including a control electrode connected to the second control node, a first electrode configured to receive the first clock signal and a second electrode connected to an output node; and a tenth transistor including a control electrode connected to the first control node, a first electrode connected to the output node and a second electrode configured to receive the first voltage.

8. The gate driving circuit of claim 1, further including a reset circuit configured to initialize the first control node and the second control node based on a reset signal, wherein the reset circuit includes:

a twelfth transistor including a control electrode configured to receive the reset signal, a first electrode configured to receive the first clock signal and a second electrode connected to a fourth node; and a thirteenth transistor including a control electrode configured to receive the reset signal, a first electrode connected to the second control node and a second electrode configured to receive the first voltage.

9. A display device comprising:

a display panel including a plurality of pixels;

a data driving circuit configured to provide a data voltage to the pixels;

a gate driving circuit configured to provide a gate signal to the pixels; and a driving controller configured to control the data driving circuit and the gate driving circuit, wherein the gate driving circuit includes:

a first control circuit configured to control a voltage of a first control node based on an input signal, a first clock signal and a second clock signal;

a second control circuit configured to control a voltage of a second control node based on the first clock signal and the second clock signal; and an output circuit configured to output the first clock signal or a first voltage as the gate signal based on the voltage of the first control node and the voltage of the second control node, wherein the second control circuit includes:

a switching circuit connected to a first node and a second node, and configured to receive the second clock signal;

a second capacitor including a first electrode connected to the first node and a second electrode connected to the second node; and a fourth capacitor including a first electrode configured to receive a second voltage and a second electrode connected to the second node.

10. The display device of claim 9, wherein the switching circuit includes:

a sixth transistor including a control electrode connected to the first node, a first electrode connected to a third node and a second electrode configured to receive the second clock signal; and a seventh transistor including a control electrode connected to the first node, a first electrode connected to the second node and a second electrode connected to the third node.

11. The display device of claim 9, wherein the switching circuit includes a seventh transistor including a control electrode connected to the first node, a first electrode connected to the second node and a second electrode configured to receive the second clock signal.

12. The display device of claim 9, wherein the second voltage is substantially the same as the first voltage.

13. The display device of claim 9, wherein the second control circuit further includes:

a third transistor including a control electrode configured to receive the first clock signal, a first electrode configured to receive the first voltage and a second electrode connected to a fifth node;

a fourth transistor including a control electrode configured to receive the first voltage, a first electrode connected to the fifth node and a second electrode connected to the first node;

a fifth transistor including a control electrode connected to the first control node, a first electrode configured to receive the first clock signal and a second electrode connected to the fifth node;

an eighth transistor including a control electrode configured to receive the second clock signal, a first electrode connected to the second node and a second electrode connected to the second control node; and a first capacitor including a first electrode configured to receive the first clock signal and a second electrode connected to the second control node.

14. The display device of claim 9, wherein the first control circuit includes:

a first transistor including a control electrode configured to receive the first clock signal, a first electrode configured to receive the input signal and a second electrode connected to a fourth node;

a second transistor including a control electrode connected to the first control node, a first electrode connected to a sixth node and a second electrode configured to receive the second clock signal;

an eleventh transistor including a control electrode configured to receive the first voltage, a first electrode connected to the fourth node and a second electrode connected to the first control node; and a third capacitor including a first electrode connected to the first control node and a second electrode connected to the sixth node.

15. The display device of claim 9, wherein the output circuit includes:

a ninth transistor including a control electrode connected to the second control node, a first electrode configured to receive the first clock signal and a second electrode connected to an output node; and a tenth transistor including a control electrode connected to the first control node, a first electrode connected to the output node and a second electrode configured to receive the first voltage.

16. The display device of claim 9, wherein the gate driving circuit further includes a reset circuit configured to initialize the first control node and the second control node based on a reset signal, wherein the reset circuit includes:

a twelfth transistor including a control electrode configured to receive the reset signal, a first electrode configured to receive the first clock signal and a second electrode connected to a fourth node; and a thirteenth transistor including a control electrode configured to receive the reset signal, a first electrode connected to the second control node and a second electrode configured to receive the first voltage.

17. An electronic device comprising:

a display panel including a plurality of pixels;

a data driving circuit configured to provide a data voltage to the pixels;

a gate driving circuit configured to provide a gate signal to the pixels;

a driving controller configured to control the data driving circuit and the gate driving circuit; and a processor configured to output a power-on signal, input image data and an input control signal to the driving controller, wherein when the electronic device is powered on, the processor is configured to output the power-on signal to the driving controller, wherein the driving controller is configured to output a reset signal to the gate driving circuit for initializing the gate driving circuit in response to the power-on signal, to output a start signal, a first clock signal and a second clock signal for operating the gate driving circuit in response to the input control signal, wherein the gate driving circuit includes:

a first control circuit configured to control a voltage of a first control node based on an input signal, the first clock signal and the second clock signal;

a second control circuit configured to control a voltage of a second control node based on the first clock signal and the second clock signal;

a reset circuit configured to initialize the first control node and the second control node based on the reset signal; and an output circuit configured to output the first clock signal or a first voltage as the gate signal based on the voltage of the first control node and the voltage of the second control node, wherein the second control circuit includes:

a switching circuit connected to a first node and a second node, and configured to receive the second clock signal;

a second capacitor including a first electrode connected to the first node and a second electrode connected to the second node; and a fourth capacitor including a first electrode configured to receive a second voltage and a second electrode connected to the second node.

18. The electronic device of claim 17, wherein the switching circuit includes:

a sixth transistor including a control electrode connected to the first node, a first electrode connected to a third node and a second electrode configured to receive the second clock signal; and a seventh transistor including a control electrode connected to the first node, a first electrode connected to the second node and a second electrode connected to the third node.

19. The electronic device of claim 17, wherein the second control circuit further includes:

a third transistor including a control electrode configured to receive the first clock signal, a first electrode configured to receive the first voltage and a second electrode connected to a fifth node;

a fourth transistor including a control electrode configured to receive the first voltage, a first electrode connected to the fifth node and a second electrode connected to the first node;

a fifth transistor including a control electrode connected to the first control node, a first electrode configured to receive the first clock signal and a second electrode connected to the fifth node;

an eighth transistor including a control electrode configured to receive the second clock signal, a first electrode connected to the second node and a second electrode connected to the second control node; and a first capacitor including a first electrode configured to receive the first clock signal and a second electrode connected to the second control node.

20. The electronic device of claim 17, wherein the first control circuit includes:

a first transistor including a control electrode configured to receive the first clock signal, a first electrode configured to receive the input signal and a second electrode connected to a fourth node;

a second transistor including a control electrode connected to the first control node, a first electrode connected to a sixth node and a second electrode configured to receive the second clock signal;

an eleventh transistor including a control electrode configured to receive the first voltage, a first electrode connected to the fourth node and a second electrode connected to the first control node; and a third capacitor including a first electrode connected to the first control node and a second electrode connected to the sixth node.

* * * * *